United States Patent [19]

Inagaki et al.

[11] Patent Number: 5,449,600
[45] Date of Patent: Sep. 12, 1995

[54] SILVER HALIDE PHOTOGRAPHIC MATERIAL

[75] Inventors: Yoshio Inagaki; Toshiaki Kubo; Kentaro Okazaki; Akira Kase, all of Kanagawa, Japan

[73] Assignee: Fuji Photo Film Co., Ltd., Kanagawa, Japan

[21] Appl. No.: 306,318

[22] Filed: Sep. 15, 1994

[30] Foreign Application Priority Data

Sep. 16, 1993 [JP] Japan .................... 5-252120

[51] Int. Cl.$^6$ ................................ G03C 1/16
[52] U.S. Cl. .................... 430/567; 430/574; 430/583
[58] Field of Search ............. 430/595, 583, 567, 574

[56] References Cited

U.S. PATENT DOCUMENTS

| | | | |
|---|---|---|---|
| 4,830,958 | 5/1989 | Okumura et al. | 430/595 |
| 4,839,270 | 6/1989 | Kojima et al. | 430/583 |
| 5,244,782 | 9/1993 | Mifune et al. | 430/583 |

FOREIGN PATENT DOCUMENTS

| | | | |
|---|---|---|---|
| 0589694 | 3/1994 | European Pat. Off. | 430/583 |
| 0073620 | 6/1979 | Japan | 430/583 |
| 0331414 | 9/1989 | Japan . | |
| 0346071 | 12/1989 | Japan . | |
| 2026712 | 2/1980 | United Kingdom | 430/583 |

*Primary Examiner*—Lee C. Wright
*Attorney, Agent, or Firm*—Sughrue, Mion, Zinn, Macpeak & Seas

[57] ABSTRACT

A silver halide color photographic material which contains a silver chlorobromide emulsion having a silver chloride content of 90 mol% or more or a silver chloride emulsion in at least one light-sensitive silver halide emulsion layer, said emulsion layer containing a 5-bromo-substituted simple cyanine dye. An image forming method comprising processing said photographic material with a processing solution containing a diaminostilbene compound having four or more strongly-hydrophilic substituents.

6 Claims, No Drawings

SILVER HALIDE PHOTOGRAPHIC MATERIAL

FIELD OF THE INVENTION

The present invention relates to a silver halide photographic material and, in particular, to that which has been color-sensitized with a particular sensitizing dye, which gives an image having few color stains to be caused by dyes remained in the processed material and which is stable during its production.

BACKGROUND OF THE INVENTION

In order to selectively elevate the sensitivity of a light-sensitive silver halide emulsion to a light falling within a particular wavelength range, employed is a color-sensitizing technique of adding a color-sensitizing dye to the silver halide emulsion.

It is important that color-sensitizing dyes not only have a color-sensitizing activity as their intrinsic function but also have no photographically-harmful effect on photographic materials. For instance, photographically-harmful effects of color-sensitizing dyes are such that the dyes remain in processed photographic materials to cause color stains and that they cause lowering of sensitivity of photographic materials or increasing of fog in them during storing photographic materials. Conventional improvements in color-sensitizing dyes have eliminated many of these harmful effects, but further improvements in them are still desired. On the other hand, since the adsorbability of conventional color-sensitizing dyes onto fine silver halide crystals varies with the lapse of time while silver halide emulsions containing them are coated on a support to produce photographic materials, it is often difficult to produce photographic materials having constant photographic properties. Therefore, it is desired to improve color-sensitizing dyes so as to evade the difficulty.

SUMMARY OF THE INVENTION

The object of the present invention is to provide a silver halide photographic material, of which the photographic properties are not worsened by dyes still remaining after processing to cause color stains in the processed material and which may be produced to have stable properties.

The object of the present invention has been attained by a silver halide photographic material containing a compound of formula (I)

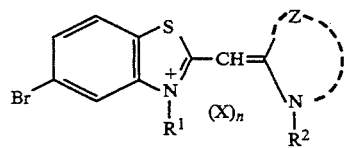

wherein Z represents an atomic group necessary for completing a 5-membered or 6-membered nitrogen-containing heterocyclic ring;
$R^1$ and $R^2$ each represent an alkyl group, an alkenyl group, an alkynyl group or an aryl group;
X represents a counter ion; and
n represents 0 or 1.

DETAILED DESCRIPTION OF THE INVENTION

Next, the present invention will be explained in more detail.

Examples of the 5-membered or 6-membered nitrogen-containing heterocyclic ring to be completed by Z in formula (I) are mentioned below, which are referred to as N-unsubstituted forms for convenience' sake.

Thiazole nuclei (e.g., thiazole, 4-methylthiazole, 4-phenylthiazole, 4,5-dimethylthiazole, 4,5-diphenylthiazole); benzothiazole nuclei (e.g., benzothiazole, 4-chlorobenzothiazole, 5-chlorobenzothiazole, 6-chlorobenzothiazole, 5-nitrobenzothiazole, 4-methylbenzothiazole, 5-methylbenzothiazole, 6-methylbenzothiazole, 5-bromobenzothiazole, 6-bromobenzothiazole , 5-iodobenzothiazole, 5-methanesulfonamidobenzothiazole, 5-methoxybenzothiazole, 6-methoxybenzothiazole, 5-ethoxybenzothiaozle, 5-ethoxycarbonylbenzothiazole, 5-carboxybenzothiazole, 5-phenethylbenzothiazole, 5-fluorobenzothiazole, 5-chloro-6-methylbenzothiazole, 5,6-dimethylthiobenzothiazole, 5,6-dimethylbenzothiazole, 5-hydroxy-6-methylbenzothiazole, tetrahydrobenzothiazole, 4-phenylbenzothiazole, 5-methyl-6-methoxybenzothiazole, in which the number of carbon atoms constituting each substituent is preferably 4 or less); naphthothiazole nuclei (e.g., naphtho[2,1-d]thiazole, naphtho[1,2-d]thiazole, naphtho[2,3-d]thiazole, 5-methoxynaphtho[1,2-d]thiazole, 7-ethoxynaphtho[2,1-d]thiazole, 8-methoxynaphtho[2,1-d]thiazole, 8-methylthionaphtho[1,2-d]thiazole, 5-methoxynaphtho[2,3-d]thiazole); thiazoline nuclei ( e. g., thiazoline, 4-methylthiazoline, 4-nitrothiazoline); oxazole nuclei (e.g., oxazole, 4-methyloxazole, 4-nitroxazole, 5-methyloxazole, 4-phenyloxazole, 4,5-diphenyloxaozole, 4-ethyloxazole), benzoxazole nuclei (e.g., benzoxazole, 5-chlorobenzoxazole, 5-methylbenzoxazole, 5-bromobenzoxazole, 5-fluorobenzoxazole, 5phenylbenzoxazole, 5-methoxybenzoxazole, 5nitrobenzoxazole, 5-trifluoromethylbenzoxazole, 5-hydroxybenzoxazole, 5-carboxybenzoxazole, 6-methylbenzoxazole, 6-chlorobenzoxazole, 6-nitrobenzoxazole, 6-methoxybenzoxazole, 6-hydroxybenzoxazole, 5,6-dimethylbenzoxazole, 4,6-dimethylbenzoxazole, 5-ethoxybenzoxazole); naphthoxazole nuclei (e.g., naphth[2,1-d]oxazole, naphth[1,2-d]oxazole, naphth[2,3-d]oxazole, 5-nitronaphth[2,1-d]oxazole); oxazoline nuclei (e.g., 4,4-dimethyloxazoline); selenazole nuclei (e.g., 4-methylselenazole, 4-nitroselenazole, 4-phenylselenazole), benzoselenazole nuclei (e.g., benzoselenazole, 5-chlorobenzoselenazole, 5-nitrobenzoselenazole, 5-methoxybenzoselenazole, 5-hydroxybenzoselenazole, 6-nitrobenzoselenazole, 5-chloro-6-nitrobenzoselenazole), naphthoselenazole nuclei (e.g., naphtho [2,1-d ]selenazole, naphtho[1,2-d]selenazole); 3,3-dialkylindolenine nuclei (e.g., 3,3-dimethylindolenine, 3,3-diethylindolenine, 3,3-dimethyl-5-cyanoindolenine, 3,3-dimethyl-6-nitroindolenine, 3,3-dimethyl-5-nitroindolenine, 3,3-dimethyl-5-methoxyindolenine, 3,3,5-trimethylindolenine, 3,3-dimethyl-5-chloroindolenine); imidazole nuclei (e.g., 1-alkylimidazole, 1-alkyl-4-phenylimidazole, 1-alkylbenzimidazole, 1-alkyl-5-chlorobenzimidaozle, 1-alkyl-5,6-dichlorobenzimidazole, 1-alkyl-5-methoxybenzimidazole, 1-alkyl-5-cyanobenzimidazole, 1-alkyl-5-fluorobenzimidazole, 1-alkyl-5-trifluoromethylbenzimidazole, 1-alkyl-6-chloro-5-cyanobenzimidazole, 1-alkyl-6-chloro-5-trifluoromethylbenzimidazole, 1-alkylnaphth[1,2- d]imidazole, 1-allyl-5,6-dichlorobenzimidazole, 1-allyl-5-chlorobenzimidazole, 1-arylimidazole, 1-arylbenzimidazole, 1-aryl-5-chlorobenzimidazole, 1-aryl-5,6-dichlorobenzimidazole, 1-aryl-5-methoxybenzimidazole, 1-aryl-5-cyanobenzimidazole, 1-arylnaphth[1,2-d]imidazole, in which the alkyl group as the substituent on the heteroring preferably has from 1 to 8 carbon atoms and, for example, it is preferably an unsubstituted alkyl group such as methyl, ethyl, propyl, isopropyl, butyl, or a hydroxyalkyl group such as 2-hydroxyethyl, 3-hydroxypropyl, especially preferably methyl or ethyl group; and the aryl group on the same is a phenyl group, a halogen (e.g., chlorine)-substituted phenyl group, an alkyl (e.g., methyl)-substituted phenyl group, or an alkoxy (e.g., methoxy)-substituted phenyl group); pyridine nuclei (e.g., 2-pyridine, 4-pyridine, 5-methyl-2-pyridine, 3-methyl-4-pyridine), quinoline nuclei (e.g., 2-quinoline, 3-methyl-2-quinoline, 5-ethyl-2-quinoline, 6-methyl-2quinoline, 6-nitro-2-quinoline, 8-fluoro-2-quinoline, 6-methoxy-2-quinoline, 6-hydroxy-2-quinoline, 8-chloro-2-quinoline, 4-quinoline, 6-ethoxy-4-quinoline, 6-nitro-4-quinoline, 8-chloro-4-quinoline, 8-fluoro-4-quinoline, 8-methyl-4-quinoline, 8-methoxy-4-quinoline, isoquinoline, 6-nitro-1-isoquinoline, 3,4-dihydro-1-isoquinoline, 6-nitro-3-isoquinoline); imidazo[4,5-b]quinoxaline nuclei (e.g., 1,3-diethylimidazo[4,5-b]quinoxaline, 6-chloro-1,3-diallylimidazo[ 4,5-b]quinoxaline); benzotellurazole nuclei (e.g., benzotellurazole, 5-methylbenzotellurazole, 5-methoxybenzotellurazole); naphthotellurazole nuclei (e.g., naphtho[1,2-d]tellurazole); oxadiazole nuclei; thiadiazole nuclei; tetrazole nuclei; pyrimidine nuclei.

Of them, benzothiazole nuclei, naphthothiazole nuclei, benzoxazole nuclei and naphthoxazole nuclei are preferred.

In the present invention, an alkyl group is preferred as $R^1$ and $R^2$ in formula (I).

The alkyl group for $R^1$ and $R^2$ in formula (I) is an alkyl group having from 1 to 18, preferably from 1 to 7, especially preferably from 1 to 4 carbon atoms. It may be either an unsubstituted alkyl group or a substituted alkyl group. Examples of the unsubstituted alkyl group include methyl, ethyl, propyl, isopropyl, butyl, isobutyl, hexyl, octyl, dodecyl and octadecyl groups. Examples of the substituted alkyl group include an arylalkyl group (e.g., benzyl, 2-phenylethyl), a hydroxyalkyl group ( e. g., 2-hydroxyethyl, 3-hydroxypropyl), a carboxyalkyl group (e.g., 2-carboxyethyl, 3-carboxypropyl, 4-carboxybutyl, carboxymethyl ), an alkoxyalkyl group (e.g., 2-methoxyethyl, 2-(2-methoxyethoxy)ethyl), a sulfoalkyl group (e.g., 2-sulfoethyl, 3-sulfopropyl, 3-sulfobutyl, 4-sulfobutyl, 4-sulfo-3-methylbutyl, 2- (3-sulfopropoxy)ethyl, 2-hydroxy-3-sulfopropyl, 3-sulfopropoxyethoxyethyl), a sulfatoalkyl group (e.g., 3-sulfatopropyl, 4-sulfatobutyl), a heterocyclic ring-substituted alkyl group (e.g., 2-(pyrrolidin-2-on-1yl)ethyl, tetrahydrofurfuryl), and 2-acetoxyethyl, carbomethoxymethyl, 2-methanesulfonylaminoethyl and allyl groups. The group may form a ring including its α-positioned methine group.

The alkenyl group for $R^1$ and $R^2$ in formula (I) is an alkenyl group having from 2 to 18, preferably from 2 to 7, especially preferably from 2 to 4 carbon atoms. It may be either an unsubstituted alkenyl group or a substituted alkenyl group. Examples of the unsubstituted alkenyl group include vinyl and propenyl groups. Examples of the substituent of the alkenyl group include those as in the alkyl group for $R^1$ and $R^2$ in formula (I). The alkenyl group for $R^1$ and $R^2$ in formula (I) preferably has one double bond.

The alkynyl group for $R^1$ and $R^2$ in formula (I) is an alkynyl group having from 2 to 18, preferably from 3 to 7, especially preferably from 3 to 4 carbon atoms. It may be either an unsubstituted alkynyl group or a substituted alkynyl group. Examples of the unsubstituted alkynyl group include ethynyl and propenyl groups. Examples of the substituent of the alkynyl group include those as in the alkyl group for $R^1$ and $R^2$ in formula (I). The alkynyl group for $R^1$ and $R^2$ in formula (I) preferably has one triple bond.

The aryl group for $R^1$ and $R^2$ in formula (I) is an aryl group having from 6 to 18, preferably from 6 to 12, especially preferably from 6 to 10 carbon atoms. It may be either an unsubstituted aryl group or a substituted aryl group. Examples of the ary group include phenyl and 4-phosphophenyl groups. Examples of the substituent of the aryl group include those as in the alkyl group for $R^1$ and $R^2$ in formula (I).

X represents a counter anion to the quaternary nitrogen cation or a cation counter to the anion of an acid group such as sulfo group. This provides the charge necessary for neutralizing the charge of the cyanine dye ion. This is not limited to only a monovalent one. Examples of the counter anion include halide ions such as $F^-$, $Cl^-$, $Br^-$, $I^-$; alkylsulfato ions such as $SO_4^{2-}$, $HSO_4^-$, $CH_3OSO_3^-$; sulfonato ions such as paratoluenesulfonato ion, methanesulfonato ion, trifluoromethanesulfonato ion; carboxylato ions such as acetato ion, trifluoroacetato ion, oxalato ion; $PF_6^-$, $BF_4^-$, $ClO_4^-$, $IO_4^-$, $PO_4^{3-}$, $NO_3^-$; and phenolato ions such as picrato ion. Examples of the counter cation include proton, alkali metal ions (e.g., lithium, sodium, potassium), alkaline earth metal ions (e.g., magnesium, calcium, barium), ammonium ion, substituted ammonium ions (e.g., triethylammonium, morpholinium, tetrabutylammonium, benzyltrimethylammonium, 1,4-diazabicyclo[2,2,2]octane-proton adduct), heterocyclic cations (e.g., pyridinium, 1-ethylpyridinium), and quaternary phosphonium ions (e.g., triphenylmethylphosphonium, tributylmethylphosphonium, 1,4-bistriphenylphosphoniobutane).

Of compounds of formula (I), especially preferred are those represented by formula (II)

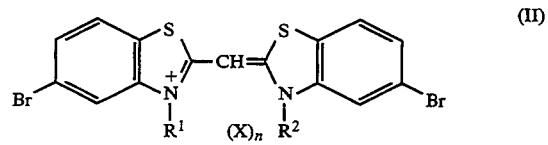

wherein $R^1$, $R^2$, X and n have the same meanings as those in formula (I).

Of compounds of formula (II), especially preferred are those where $R^1$ and $R^2$ each are a sulfoalkyl group having from 2 to 4 carbon atoms, X is a proton, an alkali metal ion such as sodium or potassium, an ammonium ion, a substituted ammonium ion (e.g., triethylammonium), or a pyridinium ion, and n is 1.

Specific examples of compounds of formula (I) for use in the present invention are mentioned below, which, however, are not limitative.

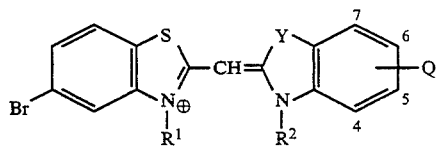

| Compound No. | R¹ | R² | Q | Y |
|---|---|---|---|---|
| 1 | $(CH_2)_3SO_3^\ominus$ | $(CH_2)_3SO_3H \cdot N(C_2H_5)_3$ | 5-Cl | S |
| 2 | $(CH_2)_4SO_3^\ominus$ | $(CH_2)_3SO_3H \cdot N(C_2H_5)_3$ | 6-OCH$_3$ | S |
| 3 | $(CH_2)_4SO_3^\ominus$ | $(CH_2)_4SO_3H \cdot N(C_2H_5)_3$ | 5-CH$_3$ | S |
| 4 | $(CH_2)_4SO_3^\ominus$ | $(CH_2)_4SO_3H \cdot N(C_2H_5)_3$ | 5-SO$_2$NHC$_6$H$_5$ | S |
| 5 | $(CH_2)_4SO_3^\ominus$ | $(CH_2)_4SO_3H \cdot N(C_2H_5)_3$ | 5-Br | S |
| 6 | $(CH_2)_4SO_3^\ominus$ | $(CH_2)_4SO_3H \cdot N(C_2H_5)_3$ | 5-Cl, 6-CH$_3$ | S |
| 7 | $(CH_2)_4SO_3^\ominus$ | $(CH_2)_2SO_3H \cdot N(C_2H_5)_3$ | 5-Ph | O |
| 8 | $(CH_2)_2SO_3^\ominus$ | $(CH_2)_2SO_3H \cdot N(C_2H_5)_3$ | 5-Ph | O |
| 9 | $(CH_2)_4SO_3^\ominus$ | $(CH_2)_4SO_3H \cdot N(C_2H_5)_3$ | 5-Ph | O |
| 10 | $(CH_2)_3SO_3^\ominus$ | $(CH_2)_4SO_3Na$ | 5-Br | S |
| 11 | $(CH_2)_4SO_3^\ominus$ | $(CH_2)_4SO_3K$ | H | S |
| 12 | $(CH_2)_4SO_3^\ominus$ | $(CH_2)_2SO_3H \cdot N\text{(pyridine)}$ | 5-Br | S |
| 13 | $(CH_2)_3SO_3^\ominus$ | $(CH_2)_3SO_3H \cdot N(C_2H_5)_3$ | 5-Br | S |
| 14 | $(CH_2)_2CH(CH_3)SO_3^\ominus$ | $(CH_2)_2CH(CH_3)SO_3H \cdot N(C_2H_5)_3$ | 5-Br | S |
| 15 | $(CH_2)_4SO_3^\ominus$ | $(CH_2)_4SO_3H \cdot N(C_2H_5)_3$ | 5-Br | O |
| 16 | $(CH_2)_4SO_3^\ominus$ | $CH_2NHSO_2CH_3$ | 5-Br | S |
| 17 | $(CH_2)_3SO_3^\ominus$ | $CH_2COOH$ | 5-CH$_3$ | Se |
| 18 | $(CH_2)_3SO_3^\ominus$ | $(CH_2)_3SO_3Na$ | Cl | O |
| 19 | $(CH_2)_3SO_3^\ominus$ | $(CH_2)_3SO_3Na$ | 5-CH$_3$ | Se |
| 20 | $(CH_2)_3SO_3^\ominus$ | $(CH_2)_3SO_3Na$ | 5,6-Cl$_2$ | N |

21.

22.

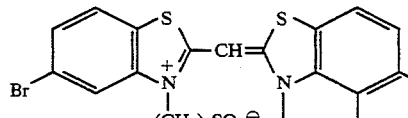

23.

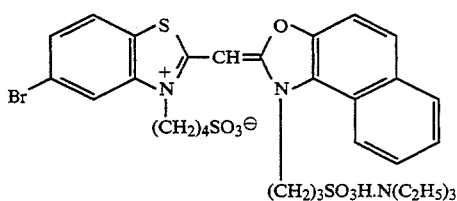

24.

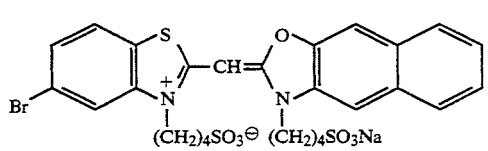

-continued

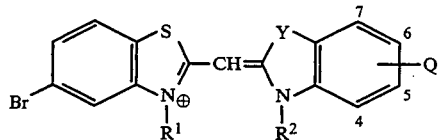

| Compound No. | R¹ | R² | Q | Y |
|---|---|---|---|---|
| 25. | 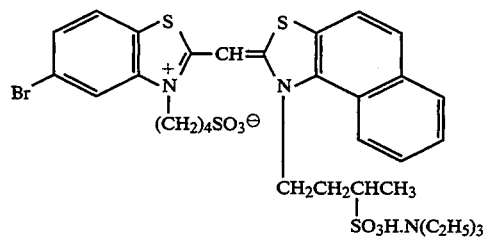 | | | |

To color-sensitize one silver halide emulsion constituting the photographic material of the present invention, one or more compounds of formula (I) may be employed. If desired, other compounds than those of formula (I) may also be employed along with compound(s) of formula (I).

As other compounds than those of formula (I) which may be employed along with compounds of formula (I), preferred are monomethine-cyanine compounds. More preferred are monomethine-thiacyanine compounds. Especially preferred are monomethine-thiacyanine having at least one naphthothiazole nucleus.

Other compounds than those of formula (I) may be used in amount of from $1\times10^{-3}$ to $1\times10^3$, preferably from $1\times10^{-2}$ to $1\times10^2$, especially preferably from $1\times10^{-1}$ to $1\times10$ mol per mol of those of formula (I).

Examples of other compounds than those of formula (I) which may be employed along with compounds of formula (I) are mentioned below, which, however, are not limitative.

A1
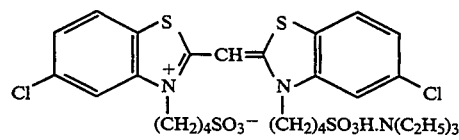

A2
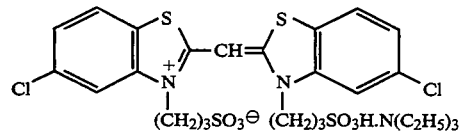

A3
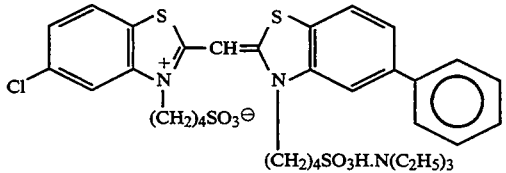

A4
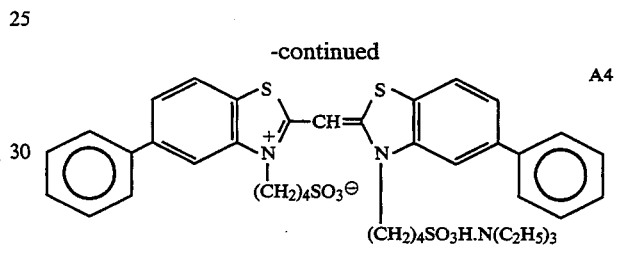

A5
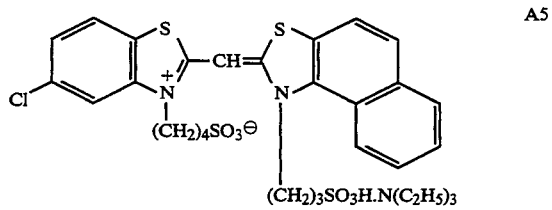

A6
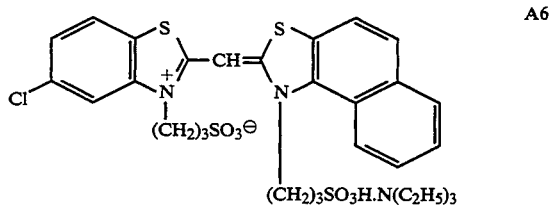

A7
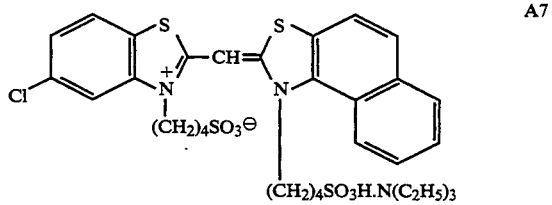

A8
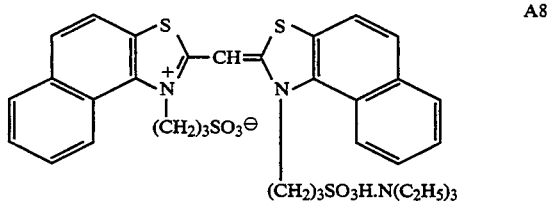

-continued

A9 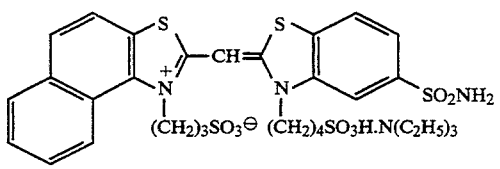

A10 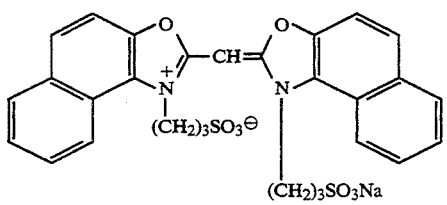

A11 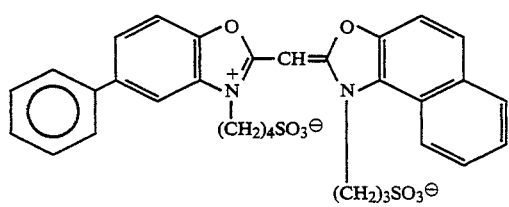

A12 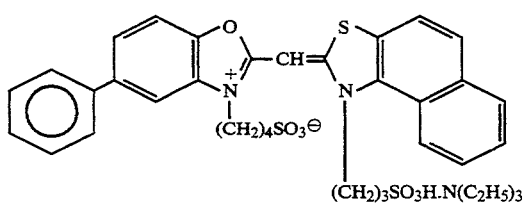

A13 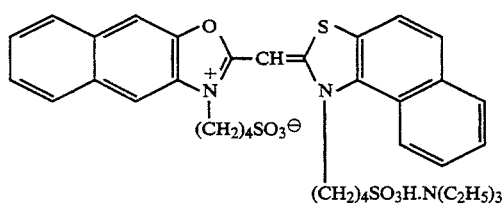

A14 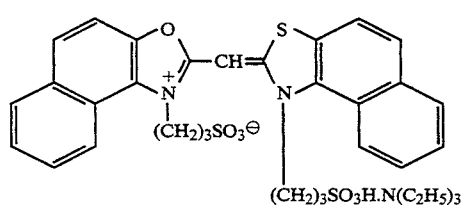

A15 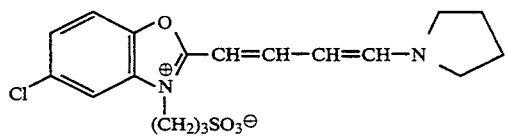

A16 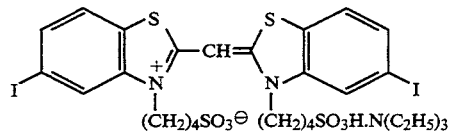

Compounds of formula (I) for use in the present invention may easily be produced by anyone skilled in the art, referring to F. M. Hatmet, *The Cyanine Dyes and Related Compounds* (Interscience Publishers, N.Y., 1964), page 55, fl.; Nikolai Tyutyulkov, Jurgen Fabian, Achim Mehlhorn, Fritz Dietz & Alia Tadjet, *Polymethine Dyes* (St. Kliment Ohridski University Press, Sofia, 1992), pp. 23–38; *Research Disclosure,* Vol. 152, p. 48 (1976), etc.

One example of a method of producing a compound of formula (I) are mentioned below. Other compounds of formula (I) may also be produced with ease in the same manner.

PRODUCTION EXAMPLE 1:

Production of Compound No. 5:

46.6 g of 5-bromo-2-methylbenzothiazole and 68 g of butanesultone were mixed and stirred under heat on an oil bath at 180° C. for 5 hours. The reaction mixture was cooled to 100° C., and 100 ml of isopropyl alcohol were added thereto and heated under reflux while stirring for 30 minutes. 100 ml of acetone were added thereto, and the reaction mixture was then cooled to 20° C. and stirred for 30 minutes. The crystals thus formed were taken out by filtration, washed with 200 ml of acetone by spraying the latter over the former, and dried at 50° C. for 12 hours to obtain 71.9 g of 4-(5-bromo-2-methylbenzothiazolio-3-yl) butanesulfonate.

To 29.1 g of the thus-obtained 4-(5-bromo-2-methylbenzothiazolio-3-yl) butanesulfonate, added were 70 ml of a mixture of methanol and acetonitrile (¼, by volume) and 12.1 g of triethylamine and heated up to 65° C. Then, a solution prepared by adding 8.5 g of 2,4-dinitrochlorobenzene to 10 ml of a mixture of methanol and acetonitrile (¼, by volume) was dropwise added thereto over a period of 30 minutes. Afterwards, this was stirred under heat at 65° C. for 40 minutes, and 80 ml of acetonitrile were added thereto. This was cooled to 10° C., while stirring over a period of 1 hour and 15 minutes, and then stirred for further 30 minutes.

The crystals formed were taken out by filtration, washed with 80 ml of methanol/acetonitrile (¼, by volume) and then with 40 ml of acetonitrile both by spraying them over the crystals, and then dried to obtain 24.9 g of Compound No. 5. This had a melting point of 300° C. or higher.

Color sensitization is effected for the purpose of making each emulsion layer constituting the photographic material of the present invention sensitive to the desired light wavelength range.

Compounds of formula (I) are preferably employed so as to color-sensitize the blue-sensitive emulsion layer of the photographic material of the present invention.

To add compounds of formula (I) to the photographic material of the present invention, preferably employed is the method described in JP-A-62-215272 (the term "JP-A" as used herein means an "unexamined published Japanese patent application").

Where color-sensitizing dyes (compounds of formula (I) and other cyanine compounds, etc.) are added to silver halide emulsions, they may directly be dispersed in emulsions, or alternatively, they may be first dissolved in a single solvent or mixed solvent of water, methanol, ethanol, propanol, methyl cellosolve and/or 2,2,3,3-tetrafluoropropanol and thereafter the resulting solution may be added to emulsions. In addition, it is also possible to form an aqueous solution of the dye in the presence of an acid or base, as so described in JP-B-44-23389, JP-B-44-27555 and JP-B-57-22089 (the term "JP-B" as used herein means an "examined Japanese patent publication"), or to form an aqueous solution or colloidal dispersion of the dye in the presence of a surfactant as so described in U.S. Pat. Nos. 3,822,135 and 4,006,025; and the resulting solution or dispersion may be added to emulsions. Further, it is also possible to dissolve the dye in a solvent, such as phenoxyethanol, which is substantially immiscible in water, then to disperse the resulting solution in water or a hydrophilic colloid; and the resulting dispersion may be added to emulsions. Further, the dye may also be dispersed directly to a hydrophilic colloid, as so described in JP-A-53-102733 and JP-A-58-105141, and the resulting dispersion may be added to emulsions.

The time of adding the dyes to emulsions may be any time which has heretofore been said useful in preparing photographic emulsions. Precisely, the time may be selected from any of before the formation of silver halide grains, during the formation of them, immediately after the formation of them to before the rinsing of them, before the chemical sensitization of them, during the chemical sensitization of them, immediately after the chemical sensitization of them to before the cooling and solidification of them, and during the preparation of the coating composition containing them.

Most generally, addition of the dyes is effected at any time of after completion of the chemical sensitization of emulsions and before coating them. If desired, the dyes may be added to emulsions at the same time of adding a chemical sensitizing agent thereto so as to effect color sensitization and chemical sensitization simultaneously, as so described in U.S. Pat. Nos. 3,628,969 and 4,225,666; or color sensitization may be effected prior to chemical sensitization as so described in JP-A-58-113928; or the dyes may be added before completion of formation of precipitates of silver halide grains to start the color sensitization prior to formation of the grains. In addition, it is also possible to stepwise partially add the color sensitizing dye as so described in U.S. Pat. No. 4,225,666; or that is, a part of the dye is added prior to chemical sensitization of emulsions and the remaining part thereof is then added after the chemical sensitization of the same. Anyhow, addition of the color sensitizing dyes to emulsions may be effected at any and every stage of forming silver halide grains of emulsions by any and every known method, for example, as taught in U.S. Pat. No. 4,183,756.

Especially preferably, the dyes are added to emulsions before rinsing emulsions with water or before chemical sensitization of them.

The amount of color-sensitizing dyes to be added to emulsions may vary broadly, and it may be preferably from $0.5 \times 10^{-6}$ mol to $1.0 \times 10^{-2}$ mol, more preferably from $1.0 \times 10^{-6}$ mol to $5.0 \times 10^{-3}$ mol, per mol of silver halide.

The range also apply to the color-sensitizing dyes of formula (I) for use in the present invention.

The silver halide grains in at least one silver halide emulsion layer (preferably all layers) constituting the photographic material of the present invention are those of silver chlorobromide having a silver chloride content of 90 mol% or more or those of silver chloride. The silver chloride content in the grains is preferably 95 mol% or more, more preferably 98 mol% or more.

In order to shorten the time for development of the photographic material of the present invention, it is preferred that the silver halide grains therein do not substantially contain silver iodide. The wording "... do not substantially contain silver iodide" as referred to herein means that the silver iodide content in the silver halide is 1 mol% or less, preferably 0.2 mol% or less. In order to elevate the high intensity sensitivity of the photographic material, to elevate the color sensitivity of the same or to elevate the stability of the same during storage, it is often recommended to employ high-silver chloride grains having from 0.01 to 3 mol% of silver iodide on their surfaces, such as those described in JP-A-3-84545.

Regarding the, halogen composition of the silver halide grains constituting the emulsions for use in the present invention, the grains may have the same halogen composition or different halogen compositions. Preferably, however, the emulsions contain grains each having the same halogen composition, as the properties of the grains may easily be homogenized.

Regarding the halogen composition distribution in the grains constituting the silver halide emulsions for use in the present invention, the grains may have a so-called uniform halogen composition structure where any part of each grain has the same halogen composition; or the grains may have a so-called laminate (core-/shell) structure where the halogen composition of the core of each grain is different from that of the shell of the same; or the grains may have a composite halogen composition structure where the inside or the surface of each grain has a non-layered different halogen composition part (for example, when such a non-layered different halogen composition part is on the surface of each grain, it may be on the edge, corner or plane of the grain as a conjugated structure). Any of such halogen compositions may properly be selected.

In order to obtain a high-sensitivity photographic material, the latter laminate or composite halogen composition structure grains are advantageously employed, rather than the first uniform halogen composition structure grains. Such laminate or composite halogen composition structure grains are also preferred in view of the pressure resistance of the photographic material containing them. In such laminate or composite halogen composition structure grains, the boundary between the different halogen composition parts may be a definite one or may also be an indefinite one of forming a mixed crystal structure therein because of the difference in the halogen compositions between the adjacent parts. If desired, the boundary between them may positively have a continuous structure variation.

In such a high silver chloride emulsion for use in the present invention, it is preferred that a silver bromide-localized phase is in the inside and/or on the surface of the silver halide grain in the form of a layered or non-layered structure such as that as mentioned above. The halogen composition in the localized phase is preferably such that the silver bromide content therein is at least 10 mol% or more, more preferably from more than 20 mol% to 100 mol%.

The silver bromide content in the silver bromide-localized phase may be analyzed, for example, by X-ray diffraction (see New Experimental Chemistry Course 6, Structure Analyses, edited by Nippon Chemical Society, published by Maruzen Co.). The localized phase may be in the inside of the grain or on the edges or corners of the surface of the grain. As one preferred embodiment, the localized phase may be on the corner parts of the grain as epitaxially grown ones.

For the purpose of reducing the amount of the replenisher to the developer for processing the photographic material of the present invention, it is also effective to further elevate the silver chloride content in the silver halide emulsions constituting the material. In such a case, an emulsion of an almost pure silver chloride having a silver chloride content of from 98 mol% to 100 mol% is preferably used.

The silver halide grains of constituting the silver halide emulsions of the present invention may have a mean grain size of preferably from 0.1 μm to 2 μm. (The grain size indicates a diameter of a circle having an area equivalent to the projected area of the grain, and the mean grain size indicates a number average value to be obtained from the measured grain sizes.)

Regarding the grain size distribution of the emulsions, so-called monodispersed emulsions having a fluctuation coefficient (to be obtained by dividing the standard deviation of the grain size distribution by the mean grain size) of being 20% or less, preferably 15% or less, more preferably 10% or less, are preferred. For the purpose of obtaining a broad latitude, two or more monodispersed emulsions may be blended to form a mixed emulsion for one layer, or they may be separately coated to form plural layers. Such blending or separate coating is preferably effected for the purpose.

Regarding the shapes of the silver halide grains of constituting the silver halide emulsions of the present invention, the grains may be regular crystalline ones such as cubic, tetradecahedral or octahedral crystalline ones, or irregular crystalline ones such as spherical or tabular crystalline ones, or may be composite crystalline ones composed of such regular and irregular crystalline ones. The emulsions may also be composed of grains of different crystalline forms. Above all, the emulsions of the present invention preferably contain regular crystalline grains in a proportion of 50% or more, preferably 70% or more, more preferably 90% or more.

In addition to them, also preferred are emulsions containing tabular silver halide grains having a mean aspect ratio (circle-corresponding diameter/thickness) of 5 or more, preferably 8 or more, in an amount of 50% (by projected area) of all grains in the emulsion.

The silver chlorobromide or silver chloride emulsions for use in the present invention can be produced by various known methods, for example, by the methods described in P. Glafkides, *Chemie et Phisique Photographique* (published by Paul Montel, 1967); G. F. Duffin, *Photographic Emulsion Chemistry* (published by Focal Press, 1966); and V. L. Zelikman et al., *Making and Coating Photographic Emulsion* (published by Focal Press, 1964). Briefly, any of known acid methods, neutral methods and ammonia methods may be employed. As a system of reacting a soluble silver salt and soluble halide(s), any of known single jet methods, double jet methods and combination of them may be employed. A so-called reverse mixing method of forming grains in an atmosphere having excess silver ions may also be employed. As one system of a double jet method, a so-called controlled double jet method of keeping the pAg value constant in the liquid phase of forming silver halide grains may also be employed. In accordance with the method, an emulsion of silver halide grains having a regular crystalline form and an almost uniform grain size may be obtained.

It is preferred to incorporate different metal ions or metal complex ions into the localized phase or the matrix of the silver halide grains for use in the present invention. Preferred are metal ions or metal complex ions of metals belonging to the Groups VIII and IIb of the Periodic Table as well as lead ion and thallium ion. The localized phase may essentially contain ions or complex ions selected from iridium, rhodium, iron, etc.; and the matrix may essentially contain metal ions and complex ions selected from osmium, iridium, rhodium, platinum, ruthenium, palladium, cobalt, nickel, iron, etc. Such metal ions and metal complex ions may be combined. If desired, the localized phase and the matrix of one grain may have different metal ions and different ion concentrations. One grain may have plural metal ions or metal complex ions. In particular, it is preferred to incorporate iron and iridium compounds in the silver bromide-localized phase.

The amount of the different metal ions or metal complex ions contained in the localized phase or the matrix, which is not limiting, is preferably from $1 \times 10^{-9}$ to $1 \times 10^{-2}$, especially preferably from $1 \times 10^{-8}$ to $1 \times 10^{-3}$ mol per mol of $Ag^+$.

To incorporate such metal ions or metal complex ions into the localized phase and/or the other area (matrix) of the silver halide grains for use in the present invention, for example, a metal ion donor compound may be added to an aqueous gelatin solution (this is a dispersing medium), an aqueous halide solution, an aqueous silver salt solution or other aqueous solutions when the silver halide grains are formed, or alternatively, fine silver halide grains containing metal ions may be added to the silver halide grains being formed. In the latter case, the fine grains are dissolved and the metal ions are transferred to the silver halide grains formed.

The incorporation of such metal ions or metal complex ions into the silver halide grains for use in the present invention may be effected at any time before forming the grains, during forming them or immediately after forming them, depending on the position in the grain at which the metal ion shall be.

The silver halide emulsions for use in the present invention are, in general, chemically sensitized.

For chemical sensitization, usable is sulfur sensitization to be effected typically by adding an unstable sulfur compound, noble metal sensitization such as typically gold sensitization, or reduction sensitization, or combination of them. As compounds to be used for such chemical sensitization, preferred are those described in JP-A-62-215272, from page 18, left bottom column to page 22, right top column.

The silver halide emulsions for use the present invention may contain various compounds as well as precursors of them, for the purpose of preventing fog of photographic materials or of stabilizing the photographic properties of them, during manufacture, storage or processing of them. Specific examples of compounds preferably usable for the purposes are described in JP-A-62-215272, pp. 39 to 72.

The photographic material of the present invention is composed of a support and at least one light-sensitive emulsion layer and other non-light-sensitive layers such as color mixing preventing layer and protective layer formed thereon.

As the support, mentioned are paper made of natural pulp or synthetic pulp, a baryta paper, a resin-coated paper formed by coating paper with a polyolefin, such as polyethylene or polypropylene, or a polyester, a synthetic high polymer film of, for example, polyethylene, polypropylene, polystyrene, polycarbonate, hard polyvinyl chloride or polyethylene terephthalate, and a natural high polymer film of, for example, cellulose diacetate, cellulose triacetate or nitrocellulose.

For attaining rapid development of the photographic material of the present invention, the material preferably has a waterproof support. For example, preferably usable are a waterproof resin-coated paper or high polymer film. Also usable is a support, whose surface has a secondary diffusive reflectivity. "Secondary diffusive reflectivity" is obtained by toughening a mirror surface of a support to make it have finely-divided mirror planes facing in different directions thereby to make the faces of the finely-divided mirror planes dispersed in different directions. The surface roughness of the surface having such a secondary diffusive reflectivity is from 0.1 to 2 $\mu$m, preferably from 0.1 to 1.2 $\mu$m, in terms of the three-dimensional mean roughness to the center plane. It is desired that the frequency of the surface roughness falls within the range of from 0.1 to 2000 cycle/mm, more preferably from 50 to 600 cycle/mm, for the rough surface having a surface roughness of 0.1 $\mu$m or more. The details of the support of this kind are described in JP-A-2-239244.

The color photographic material of the present invention may have at least one yellow color forming silver halide emulsion layer, at least one magenta color forming silver halide emulsion layer and at least one cyan color forming silver halide emulsion layer on a support. Color reproduction in ordinary color printing papers by a subtractive color process may be attained by incorporating thereinto color couplers capable of forming dyes which are complementary to the light to which the silver halide emulsions in the papers are sensitive. In ordinary color printing papers, the silver halide emulsion grains in the above-mentioned emulsion layers are color-sensitized with blue-sensitizing, green-sensitizing and red-sensitizing dyes, respectively, and the above-mentioned emulsion layers are coated on a support in order. However, the order for coating the emulsion layers is not limitative but may be varied. As the case may be, it may be preferred to coat a light-sensitive layer containing silver halide grains having the largest mean grain size as the uppermost layer so as to attain rapid processing of the photographic material, or it may be preferred to coat a magenta color forming light-sensitive layer as the lowermost layer so as to improve the stability of the material under its exposure to light.

The above-mentioned constitution of the coloring light-sensitive layers in the photographic material of the present invention is not also limitative. If desired, the material may have at least one infrared-sensitive silver halide emulsion layer.

The silver halide emulsions for use in the present invention may contain various compounds or precursors so as to prevent fog of the photographic material comprising them and to stabilize the photographic properties of the same during manufacture, storage and processing of the material. Examples of compounds preferably usable for these purposes are described in the foregoing JP-A 62-215272, pp. 39-72. In addition also preferred are 5-arylamino-1,2,3,4-thiatriazole compounds (where the aryl group has at least one electron-withdrawing group) described in EP 0447647.

The photographic material of the present invention may be exposed to either visible rays or infrared rays.

Both low illumination intensity exposure and high illumination intensity exposure may be employed. As one preferred example of high illumination intensity exposure, mentioned is a laser scanning exposure system where the exposing time is shorter than $10^{-4}$ second, preferably than $10^{-6}$ second, per pixel.

It is recommended to use a band-stop filter such as that described in U.S. Pat. No. 4,880,726, for exposing the photographic material. Using this, light stain to be applied to the material may be evaded so that the color reproducibility of the material is improved noticeably.

Any processing method effective in processing photographic materials having silver halide emulsions may be applied to the photographic material of the present invention. In particular, the photographic material of the present invention is effectively processed according to a rapid processing method to be applied to color printing papers containing high-silver chloride emulsions while reducing the amount of replenishers to be used therein.

The reduced amount of replenishers to be used in processing the photographic material varies, depending on the kind of the material. For example, when the material is a color printing paper, the total amount of the replenishers to be used in the whole process is preferably 200 ml/m$^2$ or less and, more preferably, it is 200 ml/m$^2$ or less while the sum of the replenishers to the blixing step and the rinsing and/or stabilizing step is 150 ml/m$^2$ or less. When the material is a color negative photographic materials, the total amount of the replenishers to be used in the whole process is preferably 500 ml/m$^2$ or less.

According to the process of processing the photographic material of the present invention, at least one brightening agent of the following formula (III) may be used. Four substituents Ls in formula (III) of the brightening agent have, in total, four or more strongly-hydrophilic substituents selected from the group of the following formulae (IV).

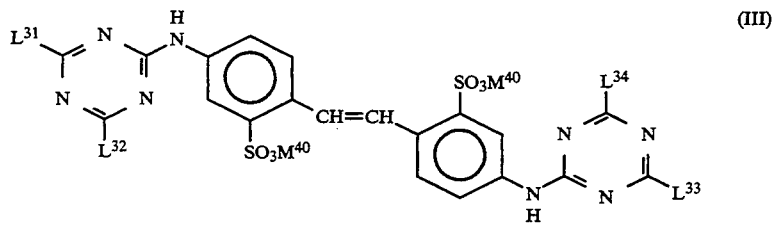
(III)

wherein $L^{31}$, $L^{32}$, $L^{33}$ and $L^{34}$ each represents —OR$^{31}$, —NR$^{32}$R$^{33}$ or —NR$^{32}$R$^{33}$R$^{34}$X;

$R^{31}$, $R^{32}$, $R^{33}$ and $R^{34}$ each represents a linear or branched alkyl group, or a linear or branched alkyl group having a substituent selected from among the group represented by formula (IV);

x represents a halogen atom;

$R^{32}$ may be a hydrogen atom;

wherein X40 represents a halogen atom;
R$^{40}$ represents an alkyl group; and $M^{40}$ in formulae (III) and (IV) each represents a hydrogen atom, an alkali metal, an alkaline earth metal, an ammonium group which may be substituted or a pyridinium group which may be substituted.

The alkyl group in $R^{31}$, $R^{32}$, $R^{33}$ and $R^{34}$ preferably has from 1 to 4, more preferably from 1 to 2 carbon atoms. The alkyl group in $R^{31}$, $R^{32}$, $R^{33}$ may be substituted by a substituent selected from among the group represented by formula (IV), or a hydroxy group.

The alkyl group in $R^{40}$ preferably has from 1 to 4, more preferably from 1 to 2 carbon atoms.

As $L^{31}$, $L^{32}$, $L^{33}$ and $L^{34}$, preferred is an alkylamino group having 1 or 2 carbon atoms, and more preferred is an alkylamino group having a sulfo group or a carboxy group such as $-NHCH_2CH_2SO_3K$ and $-NHCH_2CH_2COOH$.

Examples of $L^{31}$, $L^{32}$, $L^{33}$ and $L^{34}$ include the followings.

-continued

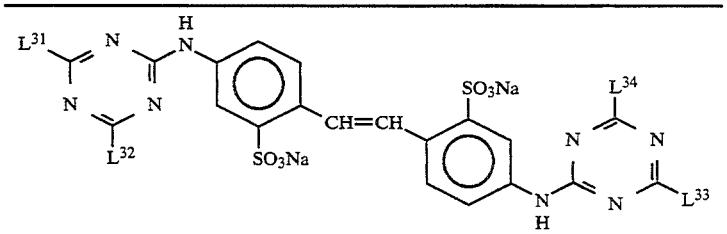

Specific examples of the brightening agent are diaminostilbene compounds shown in Table 1 below.

TABLE 1

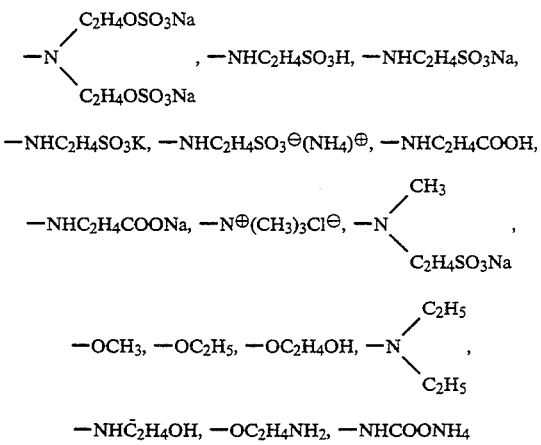

| Compound No. | $L^{31}=L^{33}$ | $L^{32}=L^{34}$ |
|---|---|---|
| SR-1 | $-OC_2H_4SO_3Na$ | $-OC_2H_4SO_3Na$ |
| SR-2 | $-OC_2H_4OSO_3Na$ | $OC_2H_4OSO_3Na$ |
| SR-3 | $-N\begin{smallmatrix}C_2H_4OSO_3Na\\C_2H_4OSO_3Na\end{smallmatrix}$ | $-N\begin{smallmatrix}C_2H_4OSO_3Na\\C_2H_4OSO_3Na\end{smallmatrix}$ |
| SR-4 | $-OC_2H_4SO_3H$ | $-OC_2H_4SO_3H$ |
| SR-5 | $-NHC_2H_4SO_3H$ | $-NHC_2H_4SO_3H$ |
| SR-6 | $-NHC_2H_4SO_3^{\ominus}(NH_4)^{\oplus}$ | $-NHC_2H_4SO_3^{\ominus}(NH_4)^{\oplus}$ |
| SR-7 | $-NHC_2H_4COOH$ | $-NHC_2H_4COOH$ |
| SR-8 | $-NHC_2H_4COOH$ | $-NHC_2H_4SO_3Na$ |
| SR-9 | $-NHC_2H_4COONa$ | $-NHC_2H_4COONa$ |
| SR-10 | $-NHC_2H_4COONa$ | $-NHC_2H_4SO_3Na$ |
| SR-11 | $-N^{\oplus}(CH_3)_3Cl^{\ominus}$ | $-N^{\oplus}(CH_3)_3Cl^{\ominus}$ |
| SR-12 | $-NHC_2H_4SO_3Na$ | $-NHC_2H_4SO_3Na$ |
| SR-13 | $-N\begin{smallmatrix}CH_3\\C_2H_4SO_3Na\end{smallmatrix}$ | $-N\begin{smallmatrix}CH_3\\C_2H_4SO_3Na\end{smallmatrix}$ |
| SR-14 | $-N\begin{smallmatrix}C_2H_5\\C_2H_4SO_3Na\end{smallmatrix}$ | $-N\begin{smallmatrix}C_2H_5\\C_2H_4SO_3Na\end{smallmatrix}$ |
| SR-15 | $-N\begin{smallmatrix}C_2H_4SO_3Na\\C_2H_4SO_3Na\end{smallmatrix}$ | $-N\begin{smallmatrix}C_2H_4SO_3Na\\C_2H_4SO_3Na\end{smallmatrix}$ |
| SR-16 | $-N\begin{smallmatrix}C_2H_4SO_3Na\\C_2H_4SO_3Na\end{smallmatrix}$ | $-OCH_3$ |
| SR-17 | $-N\begin{smallmatrix}C_2H_4SO_3Na\\C_2H_4SO_3Na\end{smallmatrix}$ | $-OC_2H_5$ |

TABLE 1-continued

Structure: L³¹—C(=N)—NH—[benzene with SO₃Na]—CH=CH—[benzene with SO₃Na]—NH—C(=N)—L³⁴, with L³² and L³³ as ring substituents on triazines.

| Compound No. | L³¹=L³³ | L³²=L³⁴ |
|---|---|---|
| SR-18 | —N(C₂H₄SO₃Na)₂ | —OC₂H₄OH |
| SR-19 | —N(C₂H₄SO₃Na)₂ | —N(C₂H₅)₂ |
| SR-20 | —N(C₂H₄SO₃Na)₂ | —NHC₂H₄OH |
| SR-21 | —N(C₂H₄SO₃Na)₂ | —OC₂H₄NH₂ |
| SR-22 | —N(C₂H₄SO₃Na)₂ | —NHCOONH₄ |
| SR-23 | —NHC₂H₄SO₃Na | —OC₂H₄SO₃Na |
| SR-24 | —NHC₂H₄SO₃Na | —N(CH₃)(C₂H₄SO₃Na) |
| SR-25 | —NHC₂H₄SO₃Na | —N(C₂H₄OSO₃Na)₂ |
| SR-26 | —NHC₂H₄SO₃Na | —NHC₂H₄COONa |

The image forming method of the present invention preferably comprises steps of color development, blixation, and rinsing and/or stabilization.

The object of the present invention may be attained by adding the brightening agent of formula (III) to any of the processing solutions for the steps of color development, blixation, and rinsing and/or stabilization. It is preferred that the processing solutions for two or more processing steps substantially contain the brightening agent.

In particular, it is preferred that the processing solution (color developer) for the color development step contains the brightening agent of formula (III).

The concentration of the brightening agent of formula (III) in the processing solution is preferably from 0.25 to 20 g/liter, more preferably from 0.5 to 10 g/liter of a running solution; and the concentration thereof in the replenisher may be one that is necessary for maintaining the defined concentration of the agent in the running solution and, concretely, it may be from 0.25 to 30 g/liter.

The brightening agent for use in the present invention may be produced by known methods.

The brightening agent of formula (III) is effective at any time when it is used singly or along with other brightening agents. Preferably, two or more different kinds of the brightening agent of formula (III) are used, as combined.

Commercial brightening agents may be combined with the brightening agent of formula (III). Examples of commercial brightening agents usable along with the brightening agent of formula (III) are described in Dyeing Note, 19th Ed. (published by Shikisen-sha KK), pp. 165–168. Of those described therein, preferred are Whitex RP (made by Sumitomo Chemical Co.) and Whitex BRF liq. (made by Sumitomo Chemical Co.).

Exposed photographic materials are subjected to conventional color development. To rapidly process the color photographic material of the present invention, the exposed material is subjected to color development and then blixation. In particular, when the material contains the above-mentioned high-silver chloride emulsion, the pH value of the blixer is preferably about 6.5 or less, more preferably about 6 or less, so as to accelerate the desilvering of the developed material.

For the silver halide emulsions and other elements (additives, etc.) of constituting the photographic material of the present invention as well as the constitution of the photographic layers (arrangement of layers, etc.) of the material, and the processing methods and the processing additives to be used for processing the material, for example, disclosures of the following references, especially the following European Patent EP 0,355,660A2 (corresponding to JP-A 2-139544)), may be referred to.

Silver halide emulsions mentioned below are those that may be used in the present invention along with the silver chlorobromide emulsion having a silver chloride content of 90 mol% or more or the silver chloride emulsion constituting the photographic material of the present invention; and color sensitizing agents mentioned below are those that may be used in the present invention along with compounds of formula (I).

| Photographic Elements | JP-A 62-215272 | JP-A 2-33144 | EP 0,355,660A2 |
|---|---|---|---|
| Silver Halide Emulsions | From page 10, right upper column, line 6 to page 12, left lower column, line 5; and from page 12, right lower column, line 4 to page 13, left upper column, line 17 | From page 28, right upper column, line 16 to page 29, right lower column, line 11; and page 30, lines 2 to 5 | From page 45, line 53 to page 47, line 3; and page 47, lines 20 to 22 |
| Silver Halide Solvents | Page 12, left lower column, lines 6 to 14; and from page 13, left upper column, line 3 from below to page 18, left lower column, last line | — | — |
| Chemical Sensitizers | Page 12, from left lower column, line 3 from below to right lower column, line 5 from below; and from page 18, right lower column, line 1 to page 22, right upper column, line 9 from below | Page 29, right lower column, line 12 to last line | Page 47, lines 4 to 9 |
| Color Sensitizers (Color Sensitizing Methods) | From page 22, right upper column, line 8 from below to page 38, last line | Page 30, left upper column, lines 1 to 13 | Page 47, lines 10 to 15 |
| Emulsion Stabilizers | From page 39, left upper column, line 1 to page 72, right upper column, last line | Page 30, from left upper column, line 14 to right upper column, line 1 | Page 47, lines 16 to 19 |
| Development Promoters | From page 72, left lower column, line 1 to page 91, right upper column, line 3 | — | — |
| Color Couplers (Cyan, Magenta and Yellow Couplers) | From page 91, right upper column, line 4 to page 121, left upper column, line 6 | From page 3, right upper column, line 14 to page 18, left upper column, last line; and from page 30, right upper column, line 6 to page 35, right lower column, line 11 | Page 4, lines 15 to 27; from page 5, line 30 to page 8, last line; page 45, lines 29 to 31; and from page 47, line 23 to page 63, line 50 |
| Coloring Enhancers | From page 121, left upper column, line 7 to page 125, right upper column, line 1 | — | — |
| Ultraviolet Absorbents | From page 125, right upper column, line 2 to page 127, left lower column, last line | From page 37, right lower column, line 14 to page 38, left upper column, line 11 | Page 65, lines 22 to 31 |
| Anti-fading Agents (Color Image Stabilizers) | From page 127, right lower column, line 1 to page 137, left lower column, line 8 | From page 36, right upper column, line 12 to page 37, left upper column, line 19 | From page 4, line 30 to page 5, line 23; from page 29, line 1 to page 45, line 25; page 45, lines 33 to 40; and page 65, lines 2 to 21 |
| High Boiling Point and/or Low Boiling Point Organic Solvents | From page 137, left lower column, line 9 to page 144, right upper column, last line | From page 35, right lower column, line 14 to page 36, left upper column, line 4 from below | Page 64, lines 1 to 51 |
| Dispersing Methods of Photographic Additives | From page 144, left lower column, line 1 to page 146, right upper column, line 7 | From page 27, right lower column, line 10 to page 28, left upper column, last line; and from page 35, right lower column, line 12, to page 36, right upper column, line 7 | From page 63, line 51 to page 64, line 56 |
| Hardening Agents | From page 146, right upper column, line 8 to page 155, left lower column, line 4 | — | — |
| Developing Agent Precursors | Page 155, from left lower column, line 5 to right lower column, line 2 | — | — |
| Development Inhibitor Releasing Compounds | Page 155, right lower column, lines 3 to 9 | — | — |
| Supports | From page 155, right lower column, line 19 to page 156, left upper column, line 14 | From page 38, right upper column, line 18 to page 39, left upper column, line 3 | From page 66, line 29 to page 67, line 13 |
| Constitution of Photographic Layers | Page 156, from left upper column, line 15 to right lower column, line 14 | Page 28, right upper column, lines 1 to 15 | Page 45, lines 41 to 52 |

-continued

| Photographic Elements | JP-A 62-215272 | JP-A 2-33144 | EP 0,355,660A2 |
|---|---|---|---|
| Dyes | From page 156, right lower column, line 15 to page 184, right lower column, last line | Page 38, from left upper column, line 12 to right upper column, line 7 | Page 66, lines 18 to 22 |
| Color Mixing Preventing Agents | From page 185, left upper column, line 1 to page 188, right lower column, line 3 | Page 36, right lower column, lines 8 to 11 | From page 64, line 57 to page 65, line 1 |
| Gradation Adjusting Agents | Page 188, right lower column, lines 4 to 8 | — | — |
| Stain Inhibitors | From page 188, right lower column, line 9 to page 193, right lower column, line 10 | Page 37, from left upper column, last line to right lower column, line 13 | From page 65, line 32 to page 66, line 17 |
| Surfactants | From page 201, left lower column, line 1 to page 210, right upper column, last one | From page 18, right upper column, line 1 to page 24, right lower column, last line; and page 27, from left lower column, line 10 from below to right lower column, line 9 | — |
| Fluorine-containing Compounds (as antistatic agents, coating aids, lubricants, and antiblocking agents, etc.) | From page 210, left lower column, line 1 to page 222, left lower column, line 5 | From page 25, left upper column, line 1 to page 27, right lower column, line 9 | — |
| Binders (hydrophilic colloids) | From page 222, left lower column, line 6 to page 225, left upper column, last line | Page 38, right upper column, lines 8 to 18 | Page 66, lines 23 to 28 |
| Tackifiers | From page 225, right upper column, line 1 to page 227, right upper column, line 2 | — | — |
| Antistatic Agents | From page 227, right upper column, line 3 to page 230, left upper column, line 1 | — | — |
| Polymer Latexes | From page 230, left upper column, line 2 to page 239, last line | — | — |
| Mat Agents | Page 240, from left upper column, line 1 to right upper column, last line | — | — |
| Photographic Processing Methods (Processing steps and additives, etc.) | From page 3, right upper column, line 7 to page 10, right upper column, line 5 | From page 39, left upper column, line 4 to page 42, left upper column, last line | From page 67, line 14 to page 69, line 28 |

The cited specification of JP-A 62-215272 is one as amended by the letter of amendment filed on Mar. 16, 1987.

As yellow couplers, so-called short-wave type yellow couplers such as those described in JP-A-63-231451, JP-A-63-123047, JP-A-63-241547, JP-A-1-173499, JP-A-1 213648 and JP-A-1-250944 are also preferably employed, in addition to those mentioned above.

It is preferred that cyan, magenta and yellow couplers are impregnated into loadable latex polymers (such as those described in U.S. Pat. No. 4,203,716) in the presence or absence of high boiling point organic solvents such as those mentioned in the foregoing table or are dissolved in water-insoluble but organic solvent-soluble polymers, and are emulsified and dispersed in aqueous hydrophilic colloid solutions.

As examples of water-insoluble but organic solvent-soluble polymers preferably usable for this purpose, mentioned are homopolymers and copolymers described in U.S. Pat. No. 4,857,449, columns 7 to 15 and International Patent Laid-Open No. W088/00723, pp. 12 to 30. More preferred are methacrylate or acrylamide polymers, as giving stable color images. Especially preferred are acrylamide polymers.

The photographic material of the present invention preferably contains a color image storability improving compound, such as those described in European Patent EP 0,277,589A2, along with couplers. It is especially preferred to combine the compound with pyrazoloazole couplers or pyrrolotriazole couplers.

Specifically, incorporation of a compound described in the foregoing EP 0,277,589A2, which may be chemically bonded to the aromatic amine developing agent as remaining after color development to form a chemically inert and substantially colorless compound, and/or a compound also described in the foregoing EP specification, which may be chemically bonded to an oxidation product of the aromatic amine developing agent as remaining after color development to form a chemically inert and substantially colorless compound, into the photographic material of the present invention is preferred, for example, for the purpose of preventing formation of stains and of preventing any other unfavorable side effects to be caused by reaction of the remaining color developing agent or an oxidation product thereof and couplers in the photographic material during storage of the processed material.

As cyan couplers, 3-hydroxypyridine cyan couplers as described in European Patent 0,333,185A2 (especially, 2-equivalentized couplers by adding a chlorinated split-off group to the illustrated 4-equivalent Coupler (42), as well as the illustrated Couplers (6) and (9)), cyclic active methylene cyan couplers as described in JP-A-64-32260 (especially, Couplers Nos. 3, 8 and 34 concretely illustrated therein), pyrrolopyrazole cyan couplers as described in European Patent EP 0, 456, 226A1, pyrroloimidazole cyan couplers as described in European Patent EP 0,484,909 and pyrrolotriazole cyan couplers as described in European Patents EP 0,488,248 and EP 0.491,197A1 are also preferably employed, in addition to diphenylimidazole cyan couplers described in JP-A-2-33144. Of those, especially preferred are pyrrolotriazole cyan couplers.

As yellow couplers, also preferably used, in addition to the compounds described in the foregoing table, are acylacetamide yellow couplers having a 3-membered to 5-membered cyclic structure in the acyl group, such as those described in European Patent EP 0,447,969A1, malondianilide yellow couplers having a cyclic structure, such as those described in European Patent EP 0482,552A1, and acylacetamide yellow couplers having a dioxane structure, such as those described in U.S. Pat. No. 5,118,599. Of those, especially preferred are acylacetamide yellow couplers in which the acyl group is a 1-alkylcyclopropane-1-carbonyl group, and malondianilide yellow couplers in which one anilide forms an indoline ring. These couplers may be used singly or as combined.

As magenta couplers, 5-pyrazolone magenta couplers and pyrazoloazole magenta couplers such as those mentioned in the foregoing table may be employed in the present invention. Above all, preferred are pyrazolotriazole couplers in which a secondary or tertiary alkyl group is directly bonded to the 2-, 3- or 6-position of the pyrazolotriazole ring, such as those described in JP-A-61-65245, pyrazoloazole couplers having a sulfonamido group in the molecule, such as those described in JP-A-61-65246, pyrazoloazole couplers having an alkoxyphenylsulfonamido ballast group, such as those described in JP-A-61-147254, and pyrazoloazole couplers having an alkoxy or aryloxy group at the 6-position, such as those described in European Patents 226,849A and 294,785A, as they have a good coloring property to give stable images having good color hue.

Next, the present invention will be explained in more detail with reference to the following examples, which, however, are not intended to restrict the scope of the present invention.

EXAMPLE 1

Preparation of Emulsion B101:

25 g of lime-processed gelatin were added to 800 cc of distilled water and dissolved therein at 40° C. 2.25 g of sodium chloride were added thereto, and this was heated up to 70° C. Subsequently, a solution of 5.0 g of silver nitrate dissolved in 140 cc of distilled water and a solution of 1.7 g of sodium chloride dissolved in 140 cc of water were added thereto and mixed still at 70° C. over a period of 40 minutes. Next, a solution of 57.5 g of silver nitrate dissolved in 160 cc of distilled water and a solution of 19.8 g of sodium chloride dissolved in 160 cc of distilled water were added thereto and mixed also at 70° C. over a period of 40 minutes.

Further, a solution of 62.5 g of silver nitrate dissolved in 160 cc of distilled water and a solution of 21.5 g of sodium chloride dissolved in 160 cc of distilled water were added thereto and mixed still at 70° C. over a period of 40 minutes. This was desalted and rinsed with water at 40° C., 76.0 g of lime-processed gelatin were added thereto, and its pH and pAg were adjusted suitably.

After this was heated up to 50° C., $3 \times 10^{-4}$ mol, per mol of silver halide, of Blue-sensitizing Dye A (mentioned below) was added thereto. Then, this was subjected to optimum chemical sensitization, using a gold sensitizing agent and a sulfur sensitizing agent. The silver chloride emulsion thus prepared was referred to as Emulsion B101.

Preparation of Emulsion B102:

Emulsion B102 was prepared in the same manner as in preparation of Emulsion B101, except that Blue-sensitizing Dye B (mentioned below) was used in place of Blue-sensitizing Dye A.

Preparation of Emulsion B103:

Emulsion B103 was prepared in the same manner as in preparation of Emulsion B101, except that Compound No. 5 for use in the present invention was used in place of Blue-sensitizing Dye A.

Preparation of Emulsion B104:

Emulsion B104 was prepared in the same manner as in preparation of Emulsion B101, except that blue-sensitizing Dye B and Compound No. 5 for use in the present invention were used in addition to Blue-sensitizing Dye A. (The amounts added are mentioned below.)

One surface of a paper support as laminated with polyethylene on its both surfaces was corona-discharged, and a gelatin subbing layer containing sodium dodecylbenzenesulfonate was provided thereon. In addition, plural photographic layers were coated thereover to form a multi-layer color photographic paper (Sample No. 101) having the layer constitution mentioned below was prepared. Coating compositions were prepared in the manner mentioned below.

Preparation of Coating Composition for First Layer:

180.0 cc of ethyl acetate, 25 g of solvent (Solv-3) and 25 g of solvent (Solv-7) were added to 153.0 g of yellow coupler (ExY), 15.0 g of color image stabilizer (Cpd-1), 7.5 g of color image stabilizer (Cpd-2) and 16.0 g of color image stabilizer (Cpd-7), and dissolved. The resulting solution was added to 1000 g of an aqueous 10% gelatin solution containing 60 cc of 10% sodium dodecylbenzenesulfonate and 10 g of citric acid and emulsified and dispersed to obtain an emulsified dispersion. This is referred to as Dispersion A.

Dispersion A and Silver Chloride Emulsion B101 were mixed to obtain a coating liquid for the first layer, having the composition mentioned below.

Other coating liquids for the second layer to seventh layer were prepared in the same manner as above. As a gelatin hardening agent for each layer, used was 1-hydroxy-3,5-dichloro-s-triazine sodium salt.

The silver chloride emulsion and the silver chlorobromide emulsion for the light-sensitive layers contained the following color-sensitizing dyes.

Blue-sensitive Emulsion Layer:
Sensitizing Dye A:

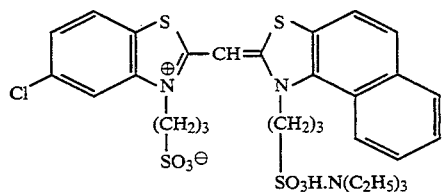

($1 \times 10^{-4}$ mol per mol of silver halide to large-size emulsion; and $1.2 \times 10^{-4}$ mol per mol of silver halide to small-size emulsion)

Sensitizing Dye B:

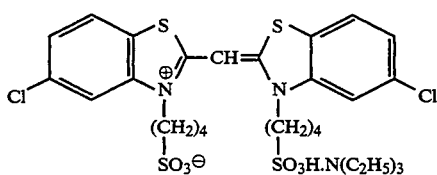

($1.6 \times 10^{-4}$ mol per mol of silver halide to large-size emulsion; and $1.9 \times 10^{-4}$ mol per mol of silver halide to small-size emulsion)
Sensitizing Dye C (Compound No. 5 of the invention):

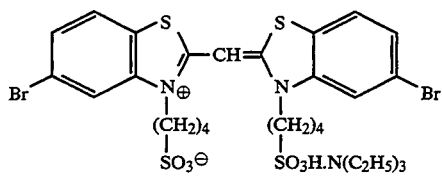

($1.6 \times 10^{-4}$ mol per mol of silver halide to large-size emulsion; and $1.9 \times 10^{-4}$ mol per mol of silver halide to small-size emulsion)
Green-sensitive Emulsion Layer:
Sensitizing Dye D:

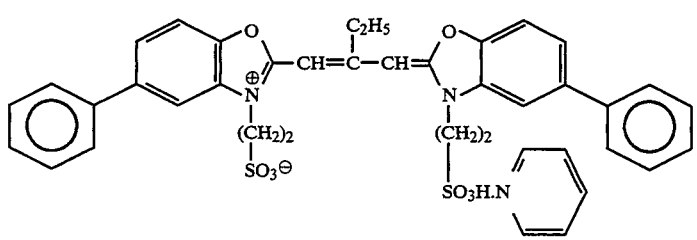

($3.0 \times 10^{-4}$ mol per mol of silver halide to large-size emulsion; and $3.6 \times 10^{-4}$ mol per mol of silver halide to small-size emulsion)
Sensitizing Dye E:

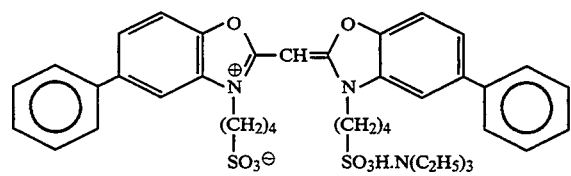

($4.0 \times 10^{-5}$ mol per mol of silver halide to large-size emulsion; and $7.0 \times 10^{-5}$ mol per mol of silver halide to small-size emulsion)
Sensitizing Dye F:

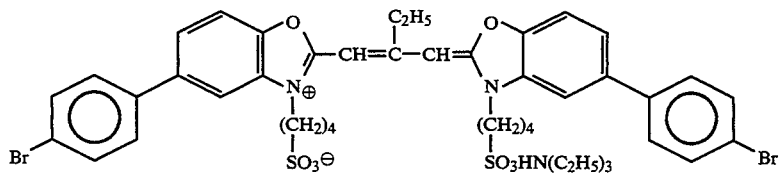

($2.0 \times 10^{-4}$ mol per mol of silver halide to large-size emulsion; and $2.8 \times 10^{-4}$ mol per mol of silver halide to small-size emulsion)
Red-sensitive Emulsion Layer:
Sensitizing Dye G:

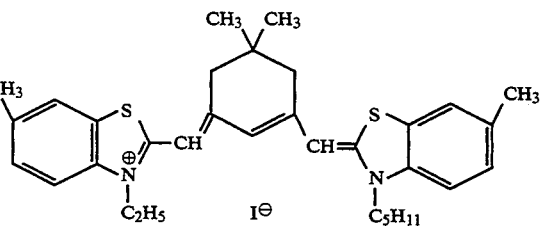

($1.0 \times 10^{-4}$ mol per mol of silver halide to large-size emulsion; and $1.2 \times 10^{-4}$ mol per mol of silver halide to small-size emulsion)
Sensitizing Dye H:

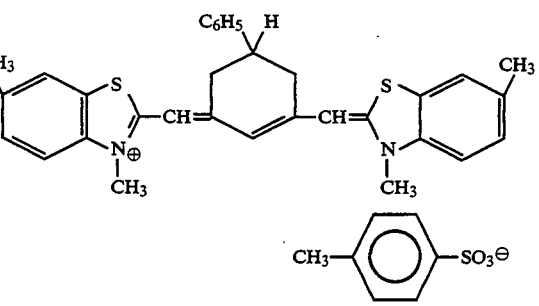

($5.0 \times 10^{-5}$ mol per mol of silver halide to large-size emulsion; and $6.0 \times 10^{-5}$ mol per mol of silver halide to small-size emulsion)
In addition, the following compound was added to the Red-sensitive Emulsion layer in an amount of $2.6 \times 10^{-3}$ mol per mol of silver halide.

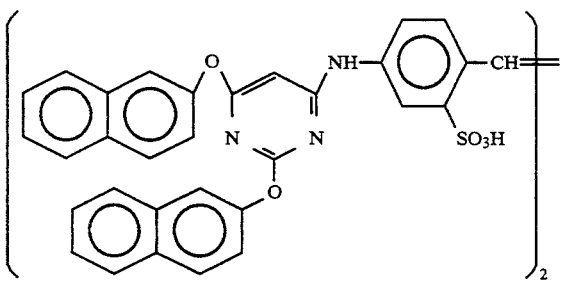

To the blue-sensitive emulsion layer, the green-sensitive emulsion layer and the red-sensitive emulsion layer was added 1-(5-methylureidophenyl)-5-mercaptotetrazole each in an amount of $3.4\times10^{-4}$ mol, $9.7\times10^{-4}$ mol and $5.5\times10^{-4}$ mol, per mol of silver halide, respectively.

To the blue-sensitive emulsion layer and the green-sensitive emulsion layer was added 4-hydroxy-6-methyl-1,3,3a,7-tetrazaindene each in an amount of $1\times10^{-4}$ mol and $2\times10^{-4}$ mol, per mol of silver halide, respectively. For anti-irradiation, the following dyes were added to the respective emulsion layers, the coated amount being parenthesized.

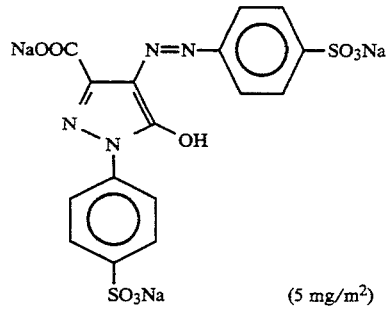

(5 mg/m²)

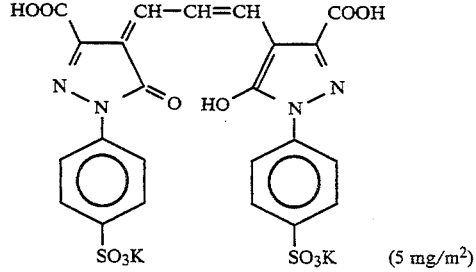

(5 mg/m²)

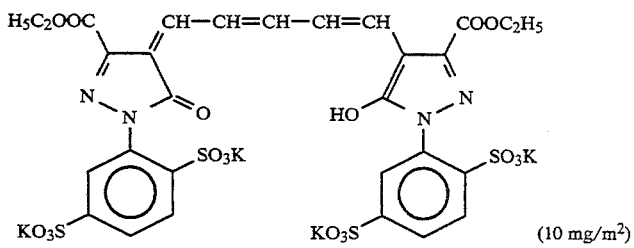

(10 mg/m²)

and

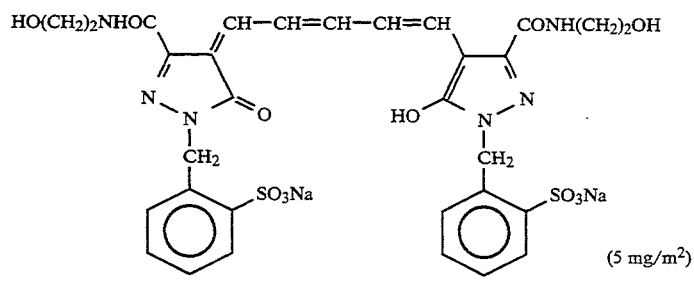

(5 mg/m²)

Layer Constitution:
Compositions of the layers of constituting the sample are mentioned below, in which the numerical value indicates the amount coated (g/m²) and the amount of the silver halide coated is represented as silver therein.
Support: Polyethylene-laminated Paper
(This contained white pigment (TiO$_2$, 14% by weight) and bluish dye (ultramarine) in polyethylene below the first layer.)

First Layer: Blue-sensitive Emulsion Layer

| | |
|---|---|
| Silver Chlorobromide Emulsion (3/7 (by mol of silver) mixture of large-size emulsion A of cubic grains with a mean grain size of 0.88 μm and small-size emulsion A of cubic grains with a mean grain size of 0.70 μm; the fluctuation coefficient of the grain size distribution of the two emulsions was 0.08 and 0.10, respectively; the silver halide grains in the both emulsions had 0.3 mol % of silver bromide locally on a part of the surface of each grain while having silver chloride as the matrix) | 0.30 |
| Gelatin | 1.46 |
| Yellow Coupler (ExY) | 0.68 |
| Color Image Stabilizer (Cpd-1) | 0.10 |
| Color Image Stabilizer (Cpd-2) | 0.05 |
| Color Image Stabilizer (Cpd-3) | 0.12 |
| Solvent (Solv-1) | 0.20 |
| Solvent (Solv-5) | 0.05 |

Second Layer: Color Mixing Preventing Layer

| | |
|---|---|
| Gelatin | 1.10 |
| Color Mixing Preventing Agent (Cpd-4) | 0.10 |
| Solvent (Solv-7) | 0.05 |
| Solvent (Solv-2) | 0.15 |
| Solvent (Solv-3) | 0.30 |
| Solvent (Solv-1) | 0.05 |

Third Layer: Green-sensitive Emulsion Layer

| | |
|---|---|
| Silver Chlorobromide Emulsion (1/3 mixture (by mol of Ag) of large-size emulsion B of cubic grains with a mean grain size of 0.55 μm and small-size emulsion B of cubic grains with a mean grain size of 0.39 μm; the two emulsions each had a fluctuation coefficient of the grain size | 0.13 |

-continued

| | |
|---|---|
| distribution of 0.10 and 0.08, respectively; they contained 0.8 mol % of silver bromide locally on a part of the surface of each grain while having silver chloride as the matrix) | |
| Gelatin | 1.45 |
| Magenta Coupler (ExM) | 0.18 |
| Color Image Stabilizer (Cpd-5) | 0.02 |
| Color Image Stabilizer (Cpd-2) | 0.01 |
| Color Image Stabilizer (Cpd-6) | 0.01 |
| Color Image Stabilizer (Cpd-7) | 0.01 |
| Color Image Stabilizer (Cpd-8) | 0.08 |
| Ultraviolet Absorbent (UV-2) | 0.15 |
| Solvent (Solv-8) | 0.56 |
| Solvent (Solv-9) | 0.24 |
| Color Image Stabilizer (Cpd-16) | 0.10 |
| Fourth Layer: Color Mixing Preventing Layer | |
| Gelatin | 0.88 |
| Color Mixing Preventing Agent (Cpd-4) | 0.08 |
| Solvent (Solv-7) | 0.04 |
| Solvent (Solv-2) | 0.12 |
| Solvent (Solv-3) | 0.24 |
| Solvent (Solv-1) | 0.04 |
| Fifth Layer: Red-sensitive Emulsion Layer | |
| Silver Chlorobromide Emulsion (1/4 mixture (by mol of Ag) of large-size emulsion C of cubic grains with a mean grain size of 0.50 μm and small-size emulsion C of cubic grains with a mean grain size of 0.41 μm; the two emulsions each had a fluctuation coefficient of the grain size distribution of 0.09 and 0.11, respectively; they contained 0.8 mol % of silver bromide locally on a part of the surface of each grain while having silver chloride as the matrix) | 0.20 |
| Gelatin | 0.85 |
| Cyan Coupler (ExC) | 0.31 |
| Ultraviolet Absorbent (UV-2) | 0.18 |
| Color Image Stabilizer (Cpd-9) | 0.01 |
| Additive (Cpd-10) | 0.01 |
| Additive (Cpd-11) | 0.01 |
| Solvent (Solv-6) | 0.25 |
| Color Image Stabilizer (Cpd-8) | 0.01 |
| Color Image Stabilizer (Cpd-6) | 0.01 |
| Solvent (Solv-1) | 0.01 |
| Color Image Stabilizer (Cpd-1) | 0.31 |
| Sixth Layer: Ultraviolet Absorbing Layer | |
| Gelatin | 0.55 |
| Ultraviolet Absorbent (UV-1) | 0.38 |
| Color Image Stabilizer (Cpd-16) | 0.05 |
| Color Image Stabilizer (Cpd-5) | 0.02 |
| Solvent (Solv-10) | 0.05 |
| Seventh Layer: Protective Layer | |
| Gelatin | 1.13 |
| Acryl-modified Copolymer of Polyvinyl Alcohol (degree of modification 17%) | 0.05 |
| Liquid Paraffin | 0.02 |
| Color Image Stabilizer (Cpd-13) | 0.01 |

The compounds used above are mentioned below.

(ExY) Yellow Coupler: 1/1 (by mol) mixture of:

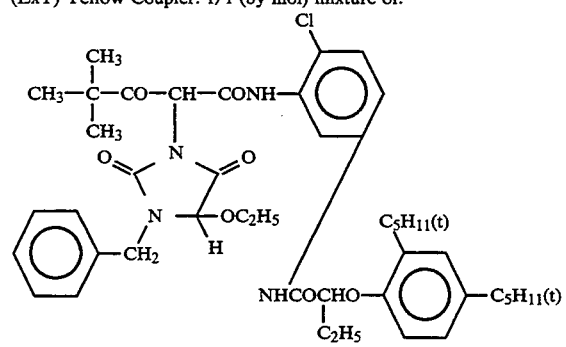

and

-continued

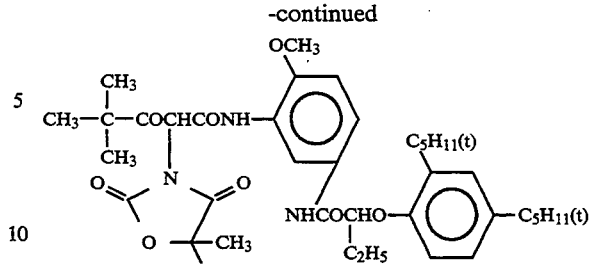

(ExM) Magenta Coupler: 1/1 (by mol) mixture of:

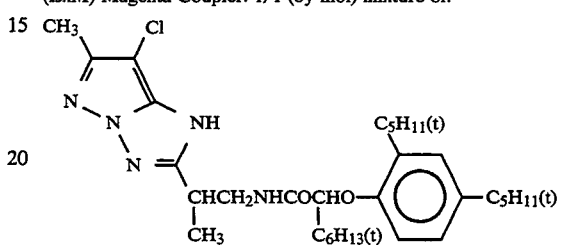

and

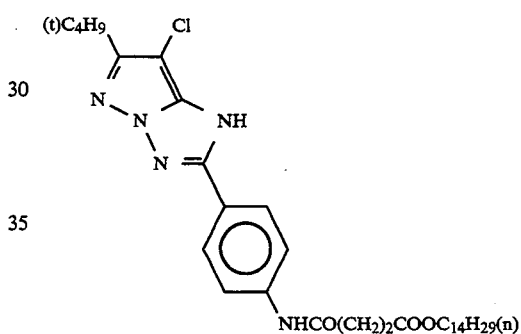

(ExC) Cyan Coupler: 25/75 (by mol) mixture of:

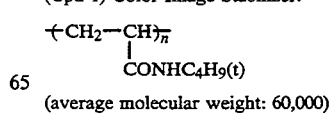

and $$\text{structure with OH, Cl, } C_2H_5, \text{NHCOC}_{15}H_{31}(n)$$

(Cpd-1) Color Image Stabilizer:

$$\mathrm{-(CH_2-CH)_{\overline{n}}}$$
$$\quad\quad\quad |$$
$$\quad\quad\quad \mathrm{CONHC_4H_9(t)}$$

(average molecular weight: 60,000)

(Cpd-2) Color Image Stabilizer:

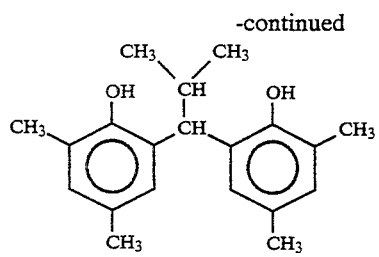

(Cpd-3) Color Image Stabilizer:

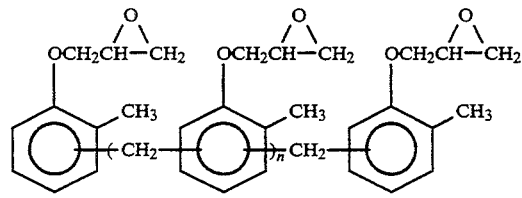

n = 7 to 8 (mean value)

(Cpd-4) Color Mixing Preventing Agent:
1/1 (by mol) mixture of (HQ-1) and (HQ-2):

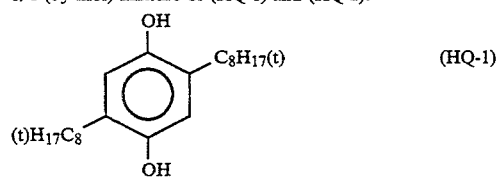

and

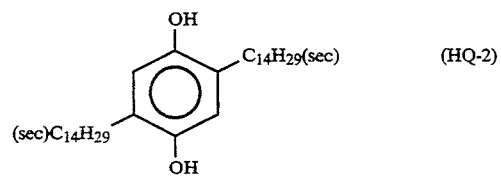

(Cpd-5) Color Image Stabilizer:

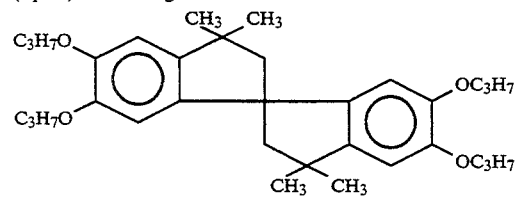

(Cpd-6) Color Image Stabilizer:

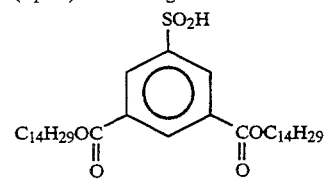

(Cpd-7) Color Image Stabilizer:

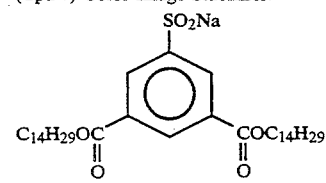

(Cpd-8) Color Image Stabilizer:

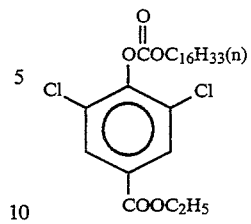

(Cpd-9) Color Image Stabilizer:

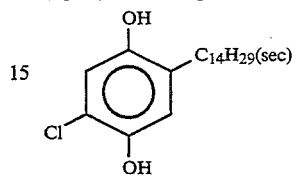

(Cpd-10) Additive:

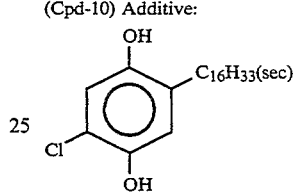

(Cpd-11) Additive:

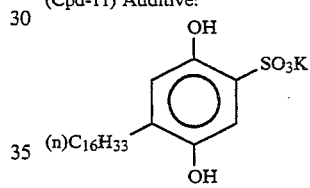

(Cpd-12) Color Image Stabilizer:

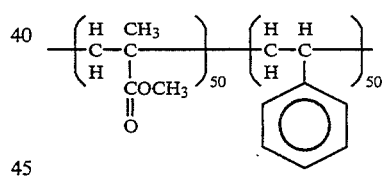

(average molecular weight: about 60,000)

(Cpd-13) Color Image Stabilizer:

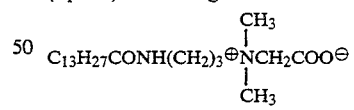

(Cpd-14) Antiseptic:

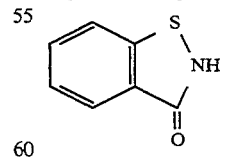

(Cpd-15) Antiseptic:

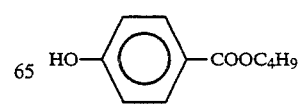

(Cpd-16) Color Image Stabilizer:

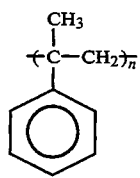
n = 15~25
(UV-1) Ultraviolet Absorbent:
1/1/2/3/2 (by weight) mixture of the following (1), (2), (3), (4), (5):
(1)
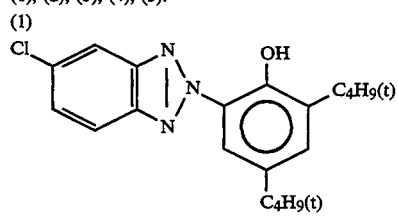
(2)
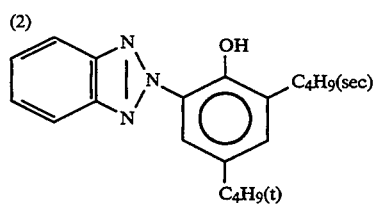
(3)
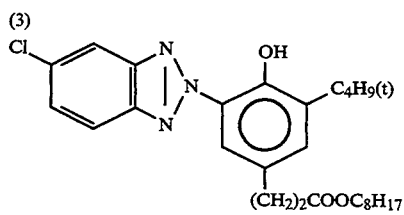
(4)
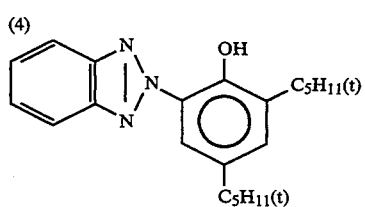
(5)
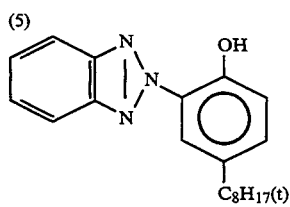
(UV-2) Ultraviolet Absorbent:
1/1/2/2 (by weight) mixture of the following (1), (2), (3), (4):
(1)
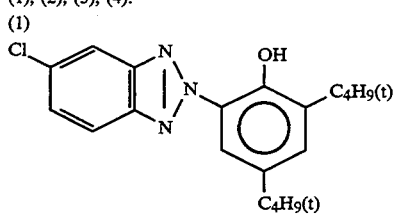
(2)
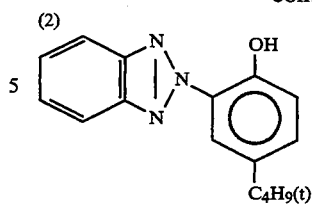
(3)
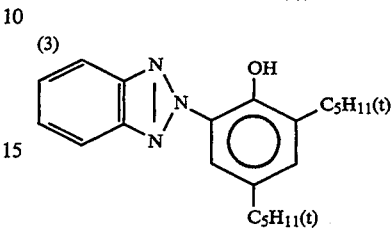
(4)
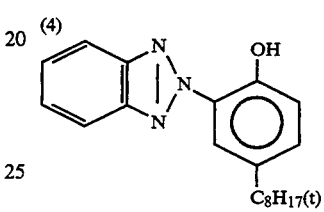
(Solv-1) Solvent:
$$C_8H_{17}CHCH(CH_2)_7COOC_8H_{17}$$
$$\diagdown O \diagup$$
(Solv-2) Solvent:
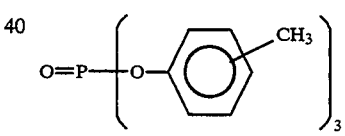
(Solv-3) Solvent:
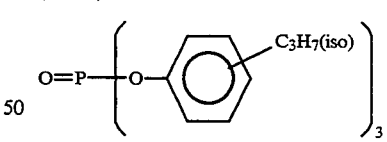
(Solv-4) Solvent:
(Solv-5) Solvent:
$$O=P\left(OCH_2\overset{C_2H_5}{\underset{|}{CH}}C_4H_9(n)\right)_3$$
(Solv-6) Solvent:
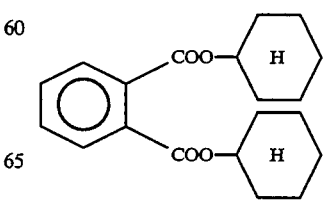
(Solv-7) Solvent:

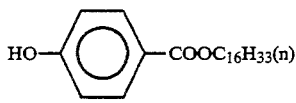

(Solv-8) Solvent:
$O=P+OC_6H_{13}(n)]_3$ (Solv-9) Solvent:
$$\begin{array}{c} COOC_4H_9 \\ | \\ (CH_2)_8 \\ | \\ COOC_4H_9 \end{array}$$

(Solv-10) Solvent:
$$\begin{array}{c} COOC_8H_{17} \\ | \\ (CH_2)_8 \\ | \\ COOC_8H_{17} \end{array}$$

Sample Nos. 102 to 104 having the same constitution as above were prepared in the same manner as in preparation of Sample No. 101 above, except that silver chloride emulsion B101 in the first layer was changed to silver chloride emulsion B102 to B104, respectively.

The sensitivity of each of Sample Nos. 101 to 104 measured immediately after their preparation was referred to as $S_0$, while that measured after they were stored at a temperature of 50° C. and a humidity of 80% RH for 3 days was as S, and the difference between the sensitivities ($\Delta S = S_0 - S$) was obtained and shown in Table 2 below.

The sensitivity referred to herein indicates a relative value of the reciprocal of the amount of exposure that gave an optical density larger than the fog by 0.2.

To evaluate Sample Nos. 101 to 104 with respect to their ability to reproduce spectra, the main wavelengths reproduced by them were obtained according to the method described in JP-A-62-160448. The difference between the wavelength ($\lambda_O$) of the test light applied to each sample and the main wavelength ($\lambda$) of the color reproduced by it, which corresponds to the absolute value of the difference between $\lambda$ and $\lambda_O$ ($|\lambda - \lambda_O|$), was obtained as the mean value from 430 nm to 550 nm, according to the equation mentioned below. The results obtained are shown in Table 2 below.

$$\Delta\lambda_{430}^{550} = \frac{\int_{430}^{550} (\lambda - \lambda_0)d\lambda}{550 - 430}$$

As the test light, used was a mixed light of (spectral light having an excitation purity of 0.7 + white light). The amount of exposure to the mixed light was 0.05 lux·sec and 0.021 lux·sec. In the latter case, the influence of the under-exposure on the color reproducibility was significant.

The samples were processed according to the method mentioned below.

Processing Method:

| Step | Temp. | Time | Replenisher* | Tank Capacity |
|---|---|---|---|---|
| Color | 35° C. | 45 sec | 125 ml | 2 liters |

| Step | Temp. | Time | Replenisher* | Tank Capacity |
|---|---|---|---|---|
| Development Blixation | 30 to 35° C. | 45 sec | 215 ml | 2 liters |
| Rinsing | 30° C. | 18 sec | 90 ml | 1 liter |
| Drying | 70 to 80° C. | 60 sec | | |

This is per m² of the sample being processed.

Compositions of the processing solutions used above are mentioned below.

| | Tank Solution | Replenisher |
|---|---|---|
| Color Developer: | | |
| Water | 800 ml | 800 ml |
| Ethylenediamine-N,N,N',N'-tetramethylene-phosphonic Acid | 1.5 g | 2.0 g |
| Potassium Bromide | 0.015 g | — |
| Triethanolamine | 8.0 g | 12.0 g |
| Sodium Chloride | 1.4 g | — |
| Potassium Bromide | 25 g | 25 g |
| N-ethyl-N-($\beta$-methanesulfonamidoethyl)-3-methyl-4-aminoaniline Sulfate | 5.0 g | 7.0 g |
| Monosodium N,N-di(sulfoethyl)-hydroxylamine | 4.0 g | 5.0 g |
| Brightening Agent (C or SR-12) | 1.0 g | 2.0 g |
| Water to make | 1000 ml | 1000 ml |
| pH (25° C.) | 10.05 | 10.45 |
| Blixer (tank solution and replenisher were the same): | | |
| Water | 400 ml | |
| Ammonium Thiosulfate (700 g/liter) | 100 ml | |
| Sodium Sulfite | 17 g | |
| Ammonium Ethylenediaminetetraacetato/Fe (III) | 55 g | |
| Disodium Ethylenediaminetetraacetate | 5 g | |
| Ammonium Bromide | 40 g | |
| Water to make | 1000 ml | |
| pH (25° C.) | 6.0 | |

Rinsing Solution (tank solution and replenisher were the same):
Ion-exchanged Water (having calcium content of 3 ppm or less and magnesium content of 3 ppm or less).

The percentages of the dyes remained in the processed samples were measured. Precisely, each processed sample was extracted with a mixture of water and methanol (1:1) and the amount of the extracted dyes was determined by high performance liquid chromatography. The thus-obtained amount was divided by the amount of the dyes added and was increased by 100 times to obtain the percentage of the dyes remained in the processed sample. The results obtained are shown in Table 3 below.

TABLE 2

| Sample | Sensitizing Dye(s) | $\Delta S$ | $\Delta\lambda_{430}^{550}$ 0.05 lux·sec | $\Delta\lambda_{430}^{550}$ 0.021 lux·sec | Remarks |
|---|---|---|---|---|---|
| 101 | A | 0.07 | 26.1 | 19.8 | comparative sample |
| 102 | B | 0.45 | 33.0 | 28.1 | comparative sample |
| 103 | 5 | 0.08 | 34.2 | 30.0 | sample of the invention |
| 104 | 5 + A + B | 0.07 | 33.8 | 29.8 | sample of the invention |

TABLE 3

| Sample | Brightening Agent | Percentage of Remained Dyes |
|---|---|---|
| 103 | C (comparative sample) | 78% |
| 103 | SR-12 (sample of the invention) | 40% |
| 104 | C (comparative sample) | 75% |
| 104 | SR-12 (sample of the invention) | 35% |

Brightening Agent C:

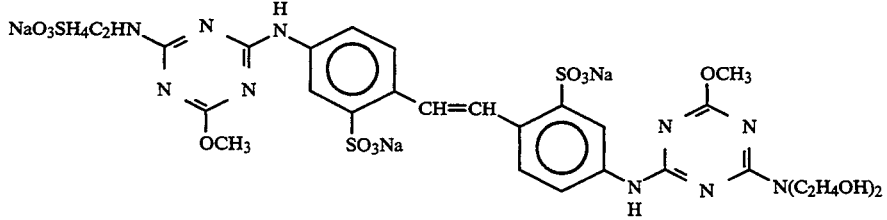

As is obvious from Table 2 above, the sensitivity of the raw film samples containing the compound of the present invention did not lower, while they were stored, and the color reproducibility of the samples of the present invention was improved. As is obvious from Table 3 above, the color stains in the samples processed by the method of the present invention were reduced.

EXAMPLE 2

Emulsions were prepared in the same manner as in preparation of Emulsion B103 in Example 1, except that the color sensitizing dye (Compound 5) was replaced by Compound 1, Compound 7, Compound 10 and Compound 12, respectively. Using these emulsions, Sample Nos. 105 to 108 were prepared in the same manner as in preparation of Sample No. 103. These samples were evaluated in the same manner as in Example 1, and almost the same results as those of Sample No. 103 in Table 2 in Example 1 were obtained. Accordingly, it was confirmed that, like Sample No. 103, the raw film sensitivity of Samples Nos. 105 to 108 of the present invention did not lower, while they were stored, and their color reproducibility was improved.

Samples Nos. 105 to 108 were processed using the same processing solutions as those used in Example 1, except that the brightening agent SR-12 in the color developer was replaced by any of SR-3, SR-24 and SR-16, and almost the same results as those in Table 3 above using SR-12 in Example 1 were obtained. In other words, it was confirmed that Sample Nos. 105 to 108 of the present invention processed with the processing solution containing the diaminostilbene brightening agent of the present invention had reduced color stains.

EXAMPLE 3

A silver chlorobromide emulsion (Emulsion B203) having a silver bromide content of 2 mol% was prepared in the same manner as in preparation of Emulsion B103 in Example 1, except that a suitable amount of potassium bromide was used along with sodium chloride. As the color-sensitizing dye, used was Compound 5.

Using Emulsion B203, Sample No. 203 was prepared in the same manner as in preparation of Sample No. 103 in Example 1. In addition, Samples Nos. 205 to 208 were prepared in the same manner as in preparation of Sample No. 203, except that the color-sensitizing dye was replaced by one employed in preparing Sample Nos. 105 to 108 in Example 2, respectively.

These Sample Nos. 203 to 208 were processed with the processing solutions containing the brightening agent of the present invention in the same manner as in Examples 1 to 2, and almost the same results as those in Examples 1 and 2 were obtained.

According to the present invention, there is provided a photographic material which is stable during its production, which has a high color reproducibility and which has few color stains after processed.

What is claimed is:

1. A silver halide color photographic material comprising a support having provided thereon at least one light-sensitive silver halide emulsion layer, wherein said at least one light-sensitive silver halide emulsion layer contains a silver chlorobromide emulsion having a silver chloride content of 90 mol% or more, or a silver chloride emulsion, and contains a compound represented by formula (II):

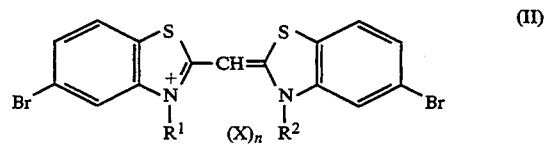

wherein $R^1$ and $R^2$ both represent a sulfoalkyl group having from 2 to 4 carbon atoms; X represents a counter ion; and n represents 0 or 1.

2. The silver halide color photographic material as claimed in claim 1, wherein said at least one light-sensitive silver halide emulsion layer further contains at least one monomethine-cyanine dye outside the scope of structural Formula (II).

3. The silver halide color photographic material as claimed in claim 1, wherein said compound represented by formula (II) is used in an amount of from $0.5 \times 10^{-6}$ to $1.0 \times 10^{-2}$ mol per mol of silver halide.

4. The silver halide color photographic material as claimed in claim 1, wherein said at least one light-sensitive silver halide emulsion layer further contains at least one monomethine-thiacyanine dye.

5. The silver halide color photographic material as claimed in claim 1, wherein said at least one light-sensitive silver halide emulsion layer further contains at least one monomethinethiacyanine dye selected from the group consisting of A1, A2, A3, A4, A5, A6, A7, A8, and A9; wherein A1–A9 are represented by the following:

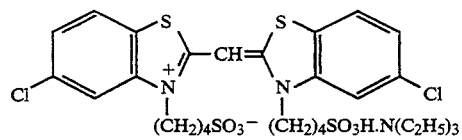
A1
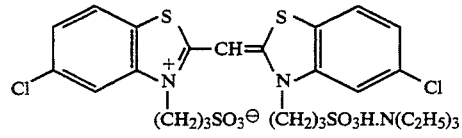
A2
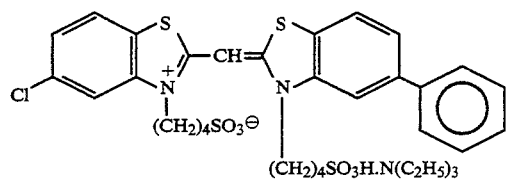
A3
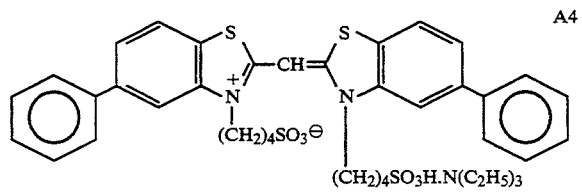
A4
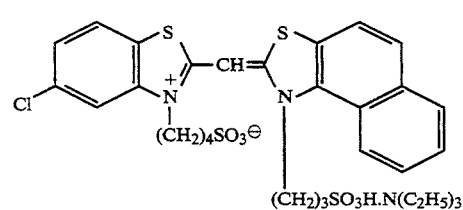
A5
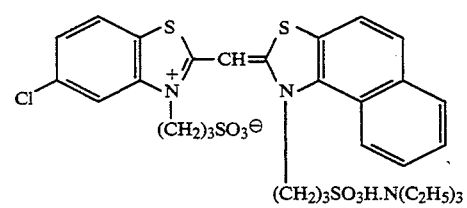
A6
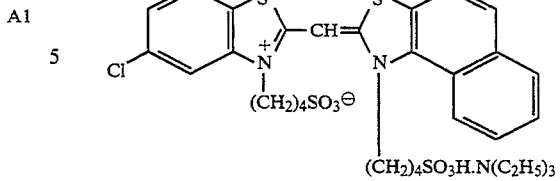
A7
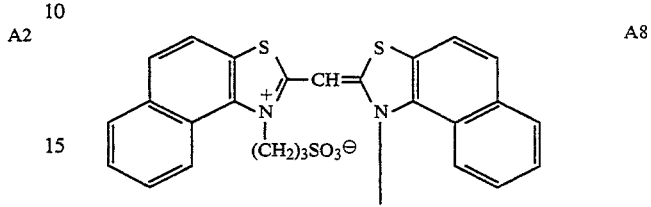
A8
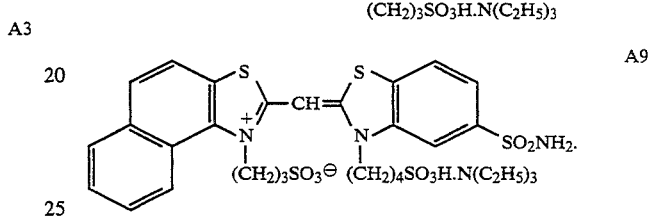
A9
6. The silver halide color photographic material as claimed in claim 1, wherein said at least one light-sensitive silver halide emulsion layer further contains both Sensitizing Dye A and Sensitizing Dye B, wherein said Sensitizing Dye A and Sensitizing Dye B are represented by the following compounds:
Sensitizing Dye A:
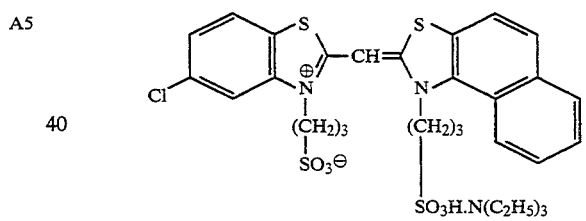
Sensitizing Dye B:
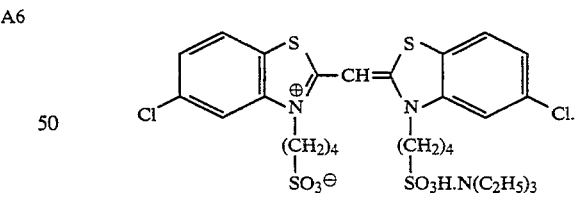
* * * * *